(12) United States Patent
Hu et al.

(10) Patent No.: US 12,040,444 B2
(45) Date of Patent: Jul. 16, 2024

(54) SOLID ELECTROLYTE, AND PREPARATION METHOD THEREFOR AND APPLICATION THEREOF

(71) Applicant: Suzhou Institute of Nano-Tech & Nano-Bionics (SINANO), Chinese Academy of Sciences, Jiangsu (CN)

(72) Inventors: Chenji Hu, Jiangsu (CN); Yanbin Shen, Jiangsu (CN); Wei Lu, Jiangsu (CN); Liwei Chen, Jiangsu (CN)

(73) Assignee: Suzhou Institute of Nano-Tech & Nano-Bionics (SINANO), Chinese Academy of Sciences, Jiangsu (CN)

( * ) Notice: Subject to any disclaimer, the term of this patent is extended or adjusted under 35 U.S.C. 154(b) by 470 days.

(21) Appl. No.: 16/969,159

(22) PCT Filed: Mar. 20, 2019

(86) PCT No.: PCT/CN2019/078874
§ 371 (c)(1),
(2) Date: Aug. 11, 2020

(87) PCT Pub. No.: WO2019/154438
PCT Pub. Date: Aug. 15, 2019

(65) Prior Publication Data
US 2020/0403266 A1    Dec. 24, 2020

(30) Foreign Application Priority Data

Feb. 11, 2018   (CN) .......................... 201810139905.5
Jul. 10, 2018   (CN) .......................... 201810748844.2

(51) Int. Cl.
*H01M 10/056*     (2010.01)
*H01M 10/0525*    (2010.01)
(Continued)

(52) U.S. Cl.
CPC ..... *H01M 10/056* (2013.01); *H01M 10/0525* (2013.01); *H01M 10/0585* (2013.01);
(Continued)

(58) Field of Classification Search
CPC ........................ H01M 10/056; H01M 10/0565
See application file for complete search history.

(56) References Cited

U.S. PATENT DOCUMENTS

2010/0035159 A1* 2/2010 Yoshino ............ H01M 10/0525
429/317
2013/0319599 A1   12/2013 Huang
(Continued)

FOREIGN PATENT DOCUMENTS

CN       1610177 A      4/2005
CN     101805454 A      8/2010
(Continued)

OTHER PUBLICATIONS

KR101676688B1 Translation from Espacenet (Year: 2016).*
(Continued)

*Primary Examiner* — Nathanael T Zemui
(74) *Attorney, Agent, or Firm* — Knobbe Martens Olson & Bear

(57) ABSTRACT

This application relates to a solid-state electrolyte and a preparation method and application thereof, the solid-state electrolyte includes membrane material(s) and electrolyte salt(s), the organic phase of the membrane material(s) includes a three-dimensionally interconnected interface and has a specific interfacial area greater than or equal to $1 \times 10^4$ $cm^2/cm^3$, and the electrolyte salt(s) is dissolved in the organic phase. The preparation method of the solid-state electrolyte includes: spraying the polymeric material solution onto the selected receiving surface using electrostatic spinning technique to form a three-dimensional structure, (Continued)

and optionally, at the same time, spraying the dispersion liquid of the inorganic particles onto the selected receiving surface using electrostatic spraying technique, then treating under pressure to give the membrane material(s), and then dropwise adding or spraying the electrolyte salt(s) solution into the membrane material(s) or immersing the thin film in the electrolyte salt(s) solution.

19 Claims, 8 Drawing Sheets

(51) Int. Cl.
    *H01M 10/0585*     (2010.01)
    *H01M 50/443*     (2021.01)
    *H01M 50/489*     (2021.01)

(52) U.S. Cl.
    CPC ........ *H01M 50/443* (2021.01); *H01M 50/489* (2021.01); *H01M 2300/0068* (2013.01); *H01M 2300/0082* (2013.01); *H01M 2300/0091* (2013.01)

(56) References Cited

U.S. PATENT DOCUMENTS

| | | | | |
|---|---|---|---|---|
| 2019/0229315 | A1* | 7/2019 | Sanchez | H01M 50/403 |
| 2020/0112050 | A1* | 4/2020 | Hu | H01M 10/0525 |
| 2020/0136113 | A1* | 4/2020 | Kumta | D01D 5/003 |

FOREIGN PATENT DOCUMENTS

| | | | |
|---|---|---|---|
| CN | 102780032 | A | 11/2012 |
| CN | 103474610 | A | 12/2013 |
| CN | 103700797 | A | 4/2014 |
| CN | 103456985 | B | 2/2016 |
| CN | 107230803 | A | 10/2017 |
| CN | 107492680 | A | 12/2017 |
| CN | 107634184 | A | 1/2018 |
| KR | 20130047424 | A | 5/2013 |
| KR | 10-2015-0084637 | | 7/2015 |
| KR | 101676688 | B1 * | 11/2016 |
| KR | 10-2017-0084912 | | 7/2017 |
| KR | 101981655 | B1 * | 8/2019 |
| WO | WO 01/091220 | | 11/2001 |

OTHER PUBLICATIONS

KR101981655B1 Translation from Espacenet (Year: 2019).*
Fu et al. "Flexible, solid-state, ion-conducting membrane with 3D garnet nanofiber networks for lithium batteries", Proc Natl Acad Sci USA 113, 7094-7099, doi: 10.1073/pnas.1600422113 (2016).
Kamaya et al., "A lithium superionic conductor", Nature materials 10, 682-686, doi: 10.1038/nmat3066 (2011).
Kato et al., "High-power all-solid-state batteries using sulfide superionic conductors", Nature Energy 1, 16030, doi: 10.1038/nenergy.2016.30 (2016).
Liu et al., "Anomalous High Ionic Conductivity of Nanoporous β-Li3PS4", Journal of the American Chemical Society 135, 975-978, doi: 10.1021/ja3110895 (2013).
Murugan et al. "Fast Lithium Ion Conduction in Garnet-Type Li7La3Zr2O12", Angewandte Chemie International Edition 46, 7778-7781, doi: 10.1002/anie.200701144 (2007).
Zhang et al., "Synergistic Coupling between Li6.75La3Zr1.75Ta0.25O12 and Poly(vinylidene fluoride) Induces High Ionic Conductivity, Mechanical Strength, and Thermal Stability of Solid Composite Electrolytes", Journal of the American Chemical Society, doi: 10.1021/jacs.7b06364 (2017).
Zhao et al., "An anion-immobilized composite electrolyte for dendrite-free lithium metal anodes", Proc Natl Acad Sci USA, doi: 10.1073/pnas.1708489114 (2017).
International Search Report issued in application No. PCT/CN2019/078874, dated Jun. 14, 2019.
Extended European Search Report issued in EP Application No. 19750692.6, dated Sep. 27, 2021.
Notice of Reasons for Refusal issued in Japanese Application No. 2020-565016, dated Sep. 30, 2021.
Notice of Reasons for Refusal issued in Korean Application No. 10-2020-7024449, dated Apr. 18, 2022.
Office Action issued in Korean Application No. 10-2020-7024449, dated Oct. 25, 2022.
Office Action issued in Korean Application No. 10-2020-7024449, dated Mar. 2, 2023.
Office Action issued in Chinese Application No. 201810748844.2, dated Feb. 3, 2020.
Written Opinion issued in Korean Application No. 10-2020-7024449, dated Jan. 26, 2023.

* cited by examiner

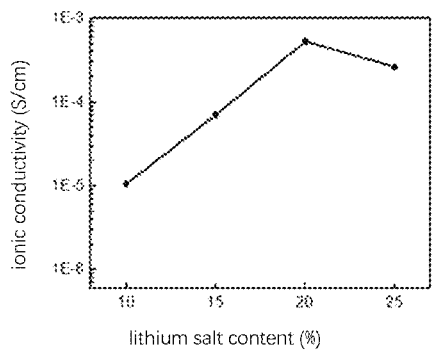
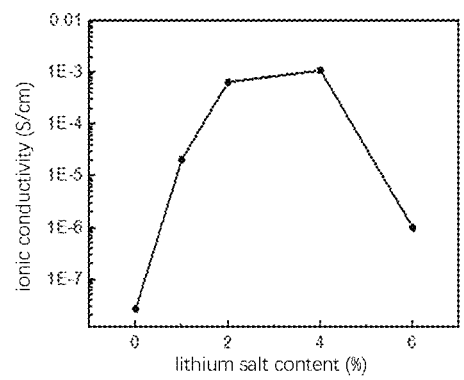
Fig. 8
Fig. 9
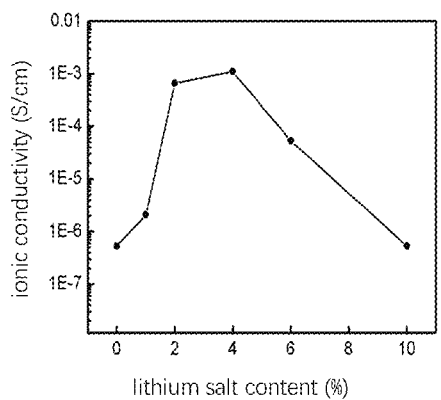
Fig. 10
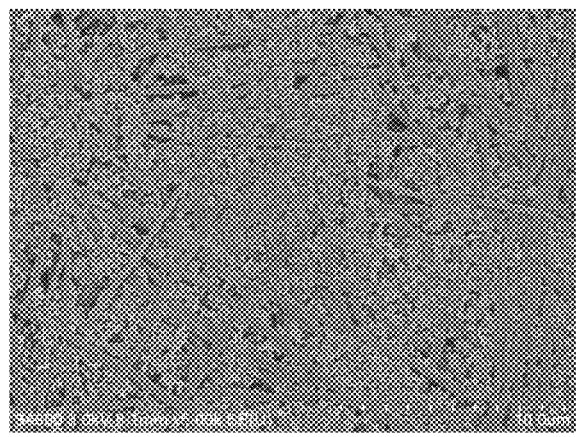
Fig. 11
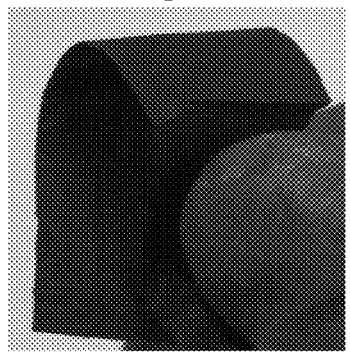
Fig. 12

SOLID ELECTROLYTE, AND PREPARATION METHOD THEREFOR AND APPLICATION THEREOF

TECHNICAL FIELD OF THE INVENTION

The present disclosure belongs to the electrochemical field, in particular, relates to a solid-state electrolyte and a preparation method thereof and an electrochemical device containing this solid-state electrolyte.

BACKGROUND OF THE INVENTION

In the past 20 years, with the rapid developments of the portable consumer electronics industry, lithium ion batteries have achieved great success in commercialization due to their high energy density and good cycle performance and rate performance. However, the safety accidents of lithium ion battery that have occurred continuously in the past few decades have been a hidden concern in the field.

Lithium ion batteries may cause fire and explosion hazards due to the excess temperature caused by internal short-circuit or other reasons, and the main reason is the use of high-temperature flammable organic electrolyte as the lithium ion conductive network. Therefore, once the internal temperature of the battery reaches the ignition point of the organic solvent for various reasons (such as a short circuit inside the battery), it will cause a fire or even an explosion of the battery, and the higher the energy density of the battery, the greater the harm. This safety problem has existed since the birth of lithium ion batteries. Research in recent decades believes that the development of all-solid-state lithium ion batteries is likely to solve this hidden danger from the root cause.

Specifically, as shown in FIG. 1, in an all-solid-state battery, since there is no flammable and decomposable organic solvent, the safety performance of the battery can be greatly improved, and at the same time, the battery will not have problems that affect the electrochemical performance of the battery, such as leakage, drying up, and gassing and swollen. Moreover, the mass of the all-solid-state battery is smaller, the volume energy density is higher, and the design and assembly of the battery are more flexible. Therefore, the development of non-flammable all-solid-state lithium ion batteries is an inevitable choice for the development of next-generation batteries with high safety, high energy density, high power density, and long cycle life. However, at present, the popularization and application of all-solid-state batteries are still restricted by many technical aspects, especially the development of solid-state electrolytes has many technical challenges. In general, an important and necessary condition for the battery to work is that ions can be transported back and forth between the cathode and anode inside the battery, and electrons can form a usable electric current through an external circuit. For liquid batteries, a liquid electrolyte with good ionic conductivity is used as an ionic transport medium between the cathode and anode, and the liquid electrolyte has sufficient contact with the cathode and anode, so the transport of ions between the cathode and anode is not a problem. For the quasi-solid-state battery that has been industrialized at present, the properties of the gel-state electrolyte are similar to those of the liquid electrolyte, but the conductivity thereof is slightly worse, and the contact with the cathode and anode material particles is relatively close, so the ionic transport between the cathode and anode is not a problem. However, for all-solid-state batteries, the ionic transport between the cathode and anode needs to depend on the solid-state electrolyte, and generally, the ionic conductivity of the solid-state electrolyte is two orders of magnitude lower than that of the liquid electrolyte, and even the solid-state electrolyte and the cathode and anode materials are in close contact, it is usually in a state of point-to-point contact, so the ion transport between the cathode and anode materials is particularly difficult.

Therefore, the core component of an all-solid-state battery is the solid-state electrolyte, and in theory, a good solid-state electrolyte needs to have the following characteristics:

(1) Good ionic conductivity, which generally needs to be close to $10^{-3}$ S/cm. At present, the lithium ion conductivity of solid-state electrolytes is relatively low (generally 2 orders of magnitude lower than that of liquid electrolytes), which is difficult to meet the needs of the practical application of batteries, especially the needs of large current charging and discharging.

(2) Low interface impedance, including the interface impedance between the solid-state electrodes and the electrolyte, and the interface impedance between the electrodes and the particles inside the electrolyte. At present, the interface resistance between the solid-state electrolyte and the solid-state active particles of the cathode and anode is large, and the resistance between the electrodes and the particles inside the electrolyte is large, resulting in that it is very difficult for the battery to charge and discharge normally.

(3) The solid-state electrolyte should be as thin as possible, so that the conductance per unit area is high, and the total resistance of the electrolyte is small; at the same time, it must have good mechanical properties to effectively separate the cathode and anode and suppress lithium dendrites; it must have a certain degree of flexibility in order to obtain good processing performance, and to accommodate the large volume changes caused by the cathode and anode materials of the battery.

In addition to the above points, the solid-state electrolyte also need to have good thermal stability, electrochemical stability, and chemical potential matching with the cathode and anode of the battery, etc.

Existing solid-state electrolytes can be divided into inorganic solid-state electrolytes and organic polymeric solid-state electrolytes, and generally, the ionic conductivity of inorganic solid-state electrolytes at room temperature is 1-2 orders of magnitude higher than the ionic conductivity of polymeric solid-state electrolytes, but its disadvantage is that the preparation conditions are harsh and the cost is too high, the interface impedance is large, and there is a contradiction between the film thickness and the material flexibility (small thickness is easy to crack), and a solid-state electrolyte entirely composed of inorganic materials is not suitable for the future large-scale industrialized production of all-solid-state batteries. Although the organic polymeric solid electrolytes produced by the prior art have low room-temperature ionic conductivities, they are generally in the range of $10^{-7}$-$10^{-5}$ S/cm, which still cannot meet the requirements of energy storage devices. However, compared with the inorganic solid-state electrolytes, the organic polymeric solid-state electrolytes usually have good flexibility and easy processing, and can be easily processed into a form similar to a separator used in a liquid electrolyte battery, which is very suitable for large-scale industrialization. Therefore, the development of organic polymeric solid electrolytes with high conductivity, high mechanical strength and high stability is an important research direction to realize the industrialization of all-solid-state batteries.

In 1973, Wright's research group first studied the ionic conductivity of polyethylene oxide (PEO) and lithium salt composites, and after that, researchers have done a lot of research in exploring new polymeric electrolyte systems, and at the same time, extensive research has been conducted on the conductive mechanism of polymeric electrolytes. The improvement of the lithium salt, the improvement of the polymer and the addition of fillers, etc., were studied to improve the ionic conductivity and other properties of the polymeric electrolytes directly or indirectly. Regarding the addition of fillers, some studies believe that the ionic conductivity can be significantly improved after the addition, and some studies believe that the impact of the addition on ionic conductivity is small. In conclusion, at present, there is no unified understanding of the ionic conduction mechanism of solid-state polymers, and the ionic conduction mechanism needs further study. As of now, the ionic conductive properties of most improved polymeric solid-state electrolytes can only reach $10^{-5}$ S/cm, and a few reported solutions can reach $10^{-4}$ S/cm (for example, polymeric electrolytes disclosed by Embodiments 2 and 3 in CN102780032A), it is rare to see polymeric solid-state electrolytes with room-temperature ionic conductivity that can reach $10^{-3}$ S/cm. In addition, polymeric solid-state electrolytes that have been reported to have ionic conductivity above $10^{-4}$ S/cm generally need to rely on the use of specific materials and/or expensive materials. For example, the ionic conductivity of the polymeric electrolytes disclosed by Embodiments 2 and 3 in CN102780032A can reach $10^{-4}$ S/cm, but a specific anatase titanium oxide must be added. The ionic conductivity of the electrolyte film disclosed in Embodiment 1 of CN107492680A can reach $10^{-4}$ S/cm, but a specific polymer must be used. Some polymeric electrolytes must add expensive fast ion conductors in order to obtain higher ionic conductivity.

SUMMARY OF THE INVENTION

The purpose of the present disclosure is to provide an improved polymeric solid-state electrolyte, to overcome the deficiencies of the prior art.

The present disclosure also provides a preparation method of a solid-state electrolyte.

To achieve the above purposes, the first aspect of the present disclosure provides a solid-state electrolyte, comprising membrane material(s) and electrolyte salt(s), wherein the membrane material(s) comprises an organic phase formed of polymeric material(s), the organic phase comprises a three-dimensionally interconnected interface and has a specific interfacial area greater than or equal to $1\times10^4$ cm$^2$/cm$^3$, and the electrolyte salt(s) is dissolved in the organic phase.

Preferably, the ionic conductivity of the solid-state electrolyte under room temperature is greater than or equal to $1.0\times10^{-4}$ S/cm.

In some specific and preferred implementations according to the present disclosure, the ionic conductivity of the solid-state electrolyte under room temperature is $1.0\times10^{-4}$ S/cm to $1.0\times10^{-2}$ S/cm.

In still other specific implementations according to the present disclosure, the ionic conductivity of the solid-state electrolyte under room temperature is $1.0\times10^{-4}$ S/cm to $1.0\times10^{-3}$ S/cm.

According to the present disclosure, the ionic conductivity of the solid-state electrolyte under room temperature increases as the specific interfacial area of the organic phase increases. Therefore, the larger the specific interfacial area of the organic phase, the better.

According to a preferred aspect of the present disclosure, the specific interfacial area of the organic phase is $1\times10^4$ cm$^2$/cm$^3$ to $1\times10^8$ cm$^2$/cm$^3$. Further preferably, the specific interfacial area of the organic phase is $3\times10^4$ cm$^2$/cm$^3$ to $1\times10^8$ cm$^2$/cm$^3$.

The membrane material(s) according to the present disclosure, can be conveniently made to any practically required thickness. Further, the thickness of the membrane material(s) (that is, the thickness of the solid-state electrolyte) may be 5 to 90 μm. Preferably, the thickness of the membrane material(s) is 5 to 89 μm. Further preferably, the thickness of the membrane material(s) is 10 to 60 μm. In some particularly preferred implementations according to the present disclosure, the thickness of the membrane material(s) is 10 to 30 μm. In some other preferred implementations according to the present disclosure, the thickness of the membrane material(s) is 10 to 30 μm. The membrane material(s) of the present disclosure has a thickness of 10 to 30 μm, not only has good mechanical properties and processing performance, but also has high conductance per unit area, low total resistance of electrolyte, and high ionic conductivity under room temperature.

According to an aspect of the present disclosure, the area specific conductance of the solid-state electrolyte at room temperature is 500 to 2500 mS·cm$^{-2}$, preferably 1000 to 2500 mS·cm$^{-2}$, and more preferably 2000 to 2500 mS·cm$^{-2}$.

According to an aspect of the present disclosure, the mass ratio of the electrolyte salt(s) to the organic phase is preferably 1:2 to 1:10, particularly preferably 1:3 to 1:6 (specifically, for example, 1:5). When the other conditions are the same, controlling the electrolyte salt(s) and the organic phase within the aforementioned range can obtain the optimal ionic conductivity under room temperature.

According to the present disclosure, one of the important features of the organic phase is to have a three-dimensionally interconnected interface, which can realize the lateral conduction of conductive ions between the cathode and anode on both sides of the solid-state electrolyte, and can achieve the longitudinal conduction of conductive ions inside the solid-state electrolyte at the same time; the second important feature of the organic phase is that the area of this three-dimensionally interconnected interface is large, so that the ions can be quickly conducted.

According to the present disclosure, the specific form and preparation method of the organic phase are not limited. As a preferred implementation of the organic phase of the present disclosure, the organic phase is formed by aggregation of polymeric fibers. The diameters of the polymeric fibers may be, for example, 50 nm to 2 μm, preferably 100 nm to 1 μm, further preferably 100 nm to 800 nm, particularly preferably 100 nm to 500 nm, and most preferably 100 to 400 nm. Specifically, they may be, for example, about 100 nm, 150 nm, 200 nm, 300 nm, or 400 nm.

According to a specific and preferred aspect of the present disclosure, the organic phase is a compact thin film formed by spraying the solution(s) of the polymeric material(s) onto a selected receiving surface using electrostatic spinning technique to form a continuous two-dimensional or three-dimensional structure, which is then treated under pressure. The organic phase has good mechanical properties and processing performance, and provides a high specific interfacial area.

According to an aspect of the present disclosure, the membrane material(s) is composed of the organic phase, that is, the membrane material(s) contains only the organic phase.

According to yet another aspect of the present disclosure, in addition to the organic phase, the membrane material(s) further comprises inorganic particles for increasing the specific interfacial area of the organic phase.

According to a preferred aspect of the present disclosure, the organic phase has secondary structure(s) formed by primary structural unit(s) in an aggregated and/or superimposed manner, the secondary structure(s) providing the three-dimensionally interconnected interface. Further preferably, the membrane material(s) further comprises inorganic particles for increasing the specific interfacial area of the organic phase, and the inorganic particles are distributed between the primary structural unit(s). In some preferred implementations according to the present disclosure, the primary structural unit(s) is selected from the group consisting of polymeric fibers, polymeric particles, and polymeric sheets and any combination thereof, and the inorganic particles are attached to and/or embedded in the surfaces of the primary structural units.

According to the present disclosure, the particle size of the inorganic particles is 2 nm to 10 μm, preferably 10 nm to 2 μm, further preferably 20 nm to 2 μm, particularly preferably 50 nm to 2 μm, most preferably 50 nm to 500 nm, and especially preferably 50 nm to 300 nm.

The purpose of the inorganic particles of the present disclosure is to provide a higher specific interfacial area, and there is no particular restriction on whether the inorganic particles are ionic conductors, for example, they can be either inorganic non-ionic conductors, or can be inorganic ionic conductors, or also can be a combination of inorganic non-ionic conductors and inorganic ionic conductors.

According to a preferred aspect of the present disclosure, the inorganic particles are inorganic non-ionic conductors, and the solid-state electrolyte obtained in this solution has good conductivity under room temperature and low cost. The inorganic non-ionic conductors may be specifically selected from the group consisting of, for example, oxides, sulfides, nitrides, fluorides, chlorides, carbides, and combinations thereof.

According to the present disclosure, the higher the content of inorganic particles in the solid-state electrolyte, the higher the specific interfacial area will be provided, and within a certain range, the higher the content of the inorganic particles in solid-state electrolyte, the better. Preferably, the content of inorganic particles in the solid-state electrolyte is greater than or equal to 5 wt. %, more preferably greater than or equal to 10 wt. %, and further preferably greater than or equal to 20 wt. %. The content of inorganic particles should not be too high, otherwise it will affect the flexibility of the solid-state electrolyte and the ionic conductivity of the electrolyte. Preferably, the content of inorganic particles in the solid-state electrolyte is less than or equal to 95 wt. %. More preferably, the content of inorganic particles in the solid-state electrolyte is less than or equal to 80 wt. %. According to some implementations of the present disclosure, the content of inorganic particles in the solid-state electrolyte is 20 wt. % to 80 wt. %. According to other implementations of the present disclosure, the content of inorganic particles in the solid-state electrolyte is 50 wt. % to 80 wt. %.

According to a particularly preferred implementation of the present disclosure, the content of inorganic particles in the solid-state electrolyte is 70 wt. % to 80 wt. %. At this case, the solid-state electrolyte not only has good ionic conductivity under room temperature but also maintains good flexibility.

According to a specific and preferred aspect of the present disclosure, the solid-state electrolyte is prepared by the following steps:

Spraying solution(s) of the polymeric material(s) onto a selected receiving surface using electrostatic spinning technique to form a primary structure(s) in the form of fibers, causing the primary structure(s) in the form of fibers to aggregate and form three-dimensional secondary structure(s), and then treating the secondary structure under pressure to be more dense to obtain the organic phase as the membrane material(s);

Dropwise adding or spraying solution(s) of electrolyte salt(s) into the membrane material(s); or, immersing the membrane material(s) in the solution(s) of electrolyte salt(s).

Compared with the solid-state electrolytes prepared by other methods, the solid-state electrolyte prepared by the above steps, on the one hand, the electrolyte salt(s) can be well complexed in the organic phase without crystallization; on the other hand, when the same mass of the polymeric materials are used, it will have a higher three-dimensionally interconnected specific interfacial area (above $10^5$ cm$^2$/cm$^3$), thus having a higher ionic conductivity under room temperature.

According to another specific and preferred aspect of the present disclosure, the solid-state electrolyte is prepared by the following steps:

Spraying solution(s) of the polymeric material(s) onto a selected receiving surface using electrostatic spinning technique to form primary structure(s) in the form of fibers and causing the primary structure(s) in the form of fibers to aggregate and form three-dimensional secondary structure(s), and at the time of performing electrostatic spinning, spraying dispersion liquid(s) of inorganic particles onto the selected receiving surface using electrostatic spraying technique to obtain a composite material constituted by the organic phase composed of the polymeric material(s) and the inorganic particles, then treating the composite material under pressure to be more dense to serve as the membrane material(s);

Dropwise adding or spraying solution(s) of the electrolyte salt(s) into the membrane material(s); or, immersing the membrane material(s) in the solution(s) of the electrolyte salt(s).

Compared with the solid-state electrolytes prepared by other methods, the solid-state electrolyte prepared by the above steps, on the one hand, the electrolyte salt(s) can be well complexed in the organic phase without crystallization; on the other hand, when the mass of the polymeric materials used are the same, it will have a higher specific interfacial area that is three-dimensionally interconnected (above $10^7$ cm$^2$/cm$^3$), thus having a higher ionic conductivity under room temperature.

According to a preferred aspect of the present disclosure, the molecular structure of the polymeric material(s) has polar group(s) capable of complexing with the metal ion(s) of the electrolyte salt(s). The polar group(s) comprises, but is not limited to, ether bonds, carbonyl, ester, amino, fluoro, amide, cyano, and the like. The polymeric material(s) generally has good solubility for the electrolyte salt(s).

According to a specific aspect of the present disclosure, the polymeric material(s) is a polymeric material(s) having molecular structure(s) with polar group(s) selected from the group consisting of ether bonds, carbonyl, ester, amino, fluorine, amide, cyano, and combinations thereof.

Further, the polymeric material(s) may be selected from the group consisting of polyacrylonitrile (PAN), polyvinylpyrrolidone (PVP), polymethyl methacrylate (PMMA), polyvinylidene fluoride (PVDF), polytetrafluoroethylene (PTFE), polyethylene oxide, polypropylene oxide, poly(ethylene succinate), polyethylene sebacate, polyethylene glycol, polyethylene glycol diamine, and combinations thereof.

According to a specific and preferred aspect of the present disclosure, the polymeric material(s) is polyacrylonitrile. At this case, the obtained solid-state electrolyte not only has good ionic conductivity under room temperature but also has good mechanical properties and electrochemical stability. According to a specific aspect of the present disclosure, the molecular weight (weight-average) of polyacrylonitrile is 90,000 to 150,000.

According to a preferred aspect of the present disclosure, the solid-state electrolyte is composed of the membrane material(s) and the electrolyte salt(s). The solid-state electrolyte has been able to gain excellent comprehensive properties, has a simple structure, and is easy to prepare.

According to another preferred aspect of the present disclosure, the membrane material(s) is composed of the organic phase or the organic phase and inorganic particles distributed at the interface of the organic phase, wherein the content of the inorganic particles in the solid-state electrolyte does not exceed 80 wt %.

The second aspect of the present disclosure provides a solid-state electrolyte comprising a continuous organic phase, the continuous organic phase is a compact thin film formed by spraying the solution(s) of the polymeric material(s) onto a selected receiving surface using electrostatic spinning technique to form a continuous two-dimensional or three-dimensional structure, which is then treated under pressure, and the electrolyte salt(s) are distributed both in the polymeric fibers constituting the continuous organic phase and in the pores contained in the continuous organic phase; and the solid-state electrolyte is in the form of a flexible thin film with a thickness ≥5 μm and <90 μm.

Further, the mass ratio of the electrolyte salt(s) to the polymeric fibers is 1:2 to 1:10, preferably 1:3 to 1:6 (specifically, for example, 1:5).

Preferably, the solid-state electrolyte further comprises a plurality of inorganic particles, the inorganic particles are filled in the pores contained in the continuous organic phase, and the inorganic particles may be the inorganic particles mentioned above.

Preferably, the content of inorganic particles in the solid-state electrolyte is greater than zero and less than or equal to 95 wt. %, preferably 50 to 95 wt. %, more preferably 70 to 95 wt. %, and even more preferably 70 to 80 wt. %.

Preferably, the solid-state electrolyte is formed by spraying the solution(s) of polymer(s) onto the selected receiving surface using electrostatic spinning technique to form the two-dimensional or three-dimensional structure, and at the same time, spraying the dispersion liquid(s) of the inorganic particles onto the selected receiving surface using electrostatic spraying technique, then treating the obtained composite material under pressure to form a compact thin film, and then immersing the thin film in the solution(s) of electrolyte salt(s).

Preferably, the polymeric material(s) may be selected from the group consisting of polyacrylonitrile, polyvinylpyrrolidone, polymethyl methacrylate, polyvinylidene fluoride, polytetrafluoroethylene, and combinations thereof.

According to the present disclosure, the electrolyte salt(s) may be those known in the art, without particular limitation. The electrolyte salt(s) may specifically be those used in the electrolyte of the secondary metal battery, such as lithium salts, sodium salts, potassium salts, magnesium salts or aluminum salts, etc., wherein, those are easily dissolved in the polymeric material(s) are preferred. As an aspect of the present disclosure, when a solid-state electrolyte is used to prepare a lithium battery, the electrolyte salt(s) may be a lithium salt such as lithium perfluoroalkyl sulfonate. Specifically, the electrolyte salt(s) is, for example, selected from the group consisting of lithium trifluoromethanesulfonate (LiTf), lithium bis(pentafluoroethanesulfonyl)imide (LiBETI), lithium bis(fluorosulfonyl)imide (LiFSI), lithium bis(trifluoromethanesulfonyl)imide (LiTFSI), lithium perchlorate, lithium hexafluoroarsenate, lithium hexafluorophosphate, and combinations thereof.

According to some implementations of the present disclosure, the density of the solid-state electrolyte is 1 to 6 $g/cm^3$.

According to some implementations of the present disclosure, the flexural strength of the solid-state electrolyte film is 5 to 20 MPa.

The third aspect of the present disclosure provides a preparation method of the solid-state electrolyte mentioned above, comprising:

(1) obtaining the membrane material(s) by the following method a) or b):
  a) spraying solution(s) of polymeric material(s) onto a selected receiving surface using electrostatic spinning technique to cause the polymeric fibers to form three-dimensional structure(s), and then treating the three-dimensional structure(s) under pressure to be more dense to obtain an organic phase with a three-dimensionally interconnected interface as the membrane material(s);
  b) spraying solution(s) of the polymeric material(s) onto a selected receiving surface using electrostatic spinning technique to aggregate the polymeric fibers to form three-dimensional structure(s), and at the time of performing electrostatic spinning, spraying dispersion liquid(s) of inorganic particles onto the selected receiving surface using electrostatic spraying technique to obtain a composite material constituted by the organic phase and the inorganic particles, then treating the composite material under pressure to be more dense to serve as the membrane material(s), wherein electrostatic spinning liquid outlet(s) for spraying the solution(s) of polymer(s) and electrostatic spraying liquid outlet(s) for spraying the dispersion liquid(s) of the inorganic particles are arranged side by side in parallel, and the spraying direction of the electrostatic spinning liquid outlet(s) and the spraying direction of the electrostatic spraying liquid outlet(s) form an angle greater than or equal to 0 and less than 90°;

(2) dropwise adding or spraying solution(s) of the electrolyte salt(s) into the membrane material(s); or, immersing the membrane material(s) in the solution(s) of the electrolyte salt(s).

For the solid-state electrolyte prepared according to the above method, not only its organic phase has a three-dimensionally interconnected interface, but also its specific interfacial area can easily reach greater than $10^5$ $cm^2/cm^3$. In addition, this method can ensure that the electrolyte salt(s) can be well dissolved in the organic phase.

According to the present disclosure, the electrostatic spinning technique and electrostatic spraying technique are all known techniques.

According to the present disclosure, the receiving surface may be a surface of a receiving device, and the receiving device is selected from the group consisting of drum receiving devices, flat receiving devices, aqueous solution receiving devices, and combinations thereof.

According to a preferred aspect of the present disclosure, the receiving device is provided with a negative charge generator.

Preferably, the receiving device is a drum receiving device, and the drum keeps rotating during spraying.

Preferably, in order to obtain the desired organic phase better, in step (1), when spraying, the electrostatic spinning liquid outlet(s) and the electrostatic spraying liquid outlet(s) move relative to the receiving surface along the axial direction, length direction or width direction of the receiving device.

The solid-state electrolyte of the present disclosure is particularly suitable for preparing electrochemical devices. To this end, the present disclosure also provides an electrochemical device comprising the solid-state electrolyte as described above.

Further, the electrochemical device may be an energy storage device or an electrochromic device. The energy storage device may be, for example, a battery, the battery is preferably an all-solid-state battery, and further, it may be a lithium ion battery, a sodium ion battery, an aluminum ion battery, a magnesium ion battery, an iron ion battery, a zinc ion battery, or the like. The electrochromic device may be, for example, an electronic book, and the electronic book further may be monochrome electronic books, or may be color electronic books.

The disclosure also relates to an all-solid-state lithium battery, which comprises a cathode, an anode and the solid-state electrolyte according to the present disclosure.

According to an aspect of the present disclosure, the cathode is formed by coating cathode material(s) on a cathode current collector. Further, the cathode material is a composite of cathode active material(s) and a solid-state electrolyte material(s).

According to another aspect of the present disclosure, the cathode is formed by coating a film-like cathode composite material on a cathode current collector.

Preferably, the cathode composite material comprises:
a continuous organic phase, formed by the aggregation of organic fiber material(s) with at least ion conductor function;
cathode active material(s), distributed in pores contained in the continuous organic phase;
an electrolyte salt(s), distributed inside the organic fiber material(s) and in the pores contained in a network structure formed by the organic fiber material(s) and the cathode active material(s);
electronic conductor additive(s) optionally added or not, dispersively distributed in the solid-state cathode composite material; and,
inorganic ionic conductor additive(s) optionally added or not, dispersively distributed in the solid-state cathode composite material;
and, the solid-state cathode composite material is in the form of a flexible film and has a thickness of 30 to 500 μm.

According to an aspect of the present disclosure, the anode is formed by coating solid-state electrolyte material(s) on metal lithium.

According to another aspect of the present disclosure, the anode is formed by coating a film-like anode composite material on an anode current collector.

Preferably, the film-like anode composite material comprises:
a continuous organic phase, formed by the aggregation of organic fiber material(s) with at least ionic conductor function;
anode active material(s), distributed in pores contained in the continuous organic phase;
electrolyte salt(s), distributed inside the organic fiber material(s) and in the pores contained in a network structure formed by the organic fiber material(s) and the anode active material(s);
electronic conductor additive(s) optionally added or not, dispersively distributed in the solid-state anode composite material; and,
inorganic ionic conductor additive(s) optionally added or not, dispersively distributed in the solid-state anode composite material;
and, the solid-state anode composite material is in the form of a flexible film and has a thickness of 30 to 500 μm.

Due to the implementation of the above technical solutions, the present disclosure has the following advantages over the prior art:

Different from the principle believed by the traditions that conductive ions such as lithium ions are conducted from the inside of the polymer, the inventors of the present disclosure have accidentally discovered in a large number of experimental studies that for polymeric solid-state electrolytes, conductive ions are mainly conducted from the interfaces of the polymers. Thus, the organic phase with a three-dimensionally interconnected interface and having a higher specific interfacial area provided by the present disclosure can realize the rapid conduction of ions between the cathode and the anode, thereby having a significantly improved ionic conductivity under room temperature. Taking advantage of this principle, the inventor has successfully prepared a solid-state electrolyte with a conductivity under room temperature of greater than $10^{-3}$ S/cm, meeting the needs of solid-state batteries. In addition, the solid-state electrolyte of the present disclosure does not depend on the addition of special polymers or fillers, and has the advantages of simple preparation, low cost, and wide source of raw materials, etc.

The preparation method of the solid-state electrolyte provided by the present disclosure can obtain solid-state electrolytes with high conductivity under room temperature, good uniformity and stability, and thin thickness in batches (the 5 micron thick solid-state electrolytes prepared in the embodiments of the present disclosure have an area specific conductance of up to 2400 mS·cm$^{-2}$, which is at the highest level among the solid-state electrolytes currently reported), and the method has good repeatability and stability; in addition, the method has good controllability and can easily obtain solid-state electrolytes with various specific interfacial areas.

BRIEF DESCRIPTION OF THE DRAWINGS

For more clearly explaining the technical solutions in the embodiments of the present disclosure or the prior art, the accompanying drawings used to describe the embodiments or the prior art are simply introduced in the following. Apparently, the below described drawings merely show a part of the embodiments of the present disclosure, and those skilled in the art can obtain other drawings according to the accompanying drawings without creative work.

FIG. 8 is a trend diagram of the conductivity of a solid-state electrolyte formed by immersing polyacrylonitrile fibers prepared by electrostatic spinning in a lithium salt in Embodiment 1-4 of the present disclosure as the lithium salt content changes;

FIG. 9 is a trend diagram of the conductivity of a solid-state electrolyte film prepared by electrostatic spinning and electrostatic spraying at the same time in Embodiment 1-6 of the present disclosure as the lithium salt content changes (wherein the inorganic particles are ionic conductors);

FIG. 10 is a trend diagram of the conductivity of a solid-state electrolyte film prepared by electrostatic spinning and electrostatic spraying at the same time in Embodiment 1-7 of the present disclosure as the lithium salt content changes (wherein the inorganic particles are non-ionic conductors);

FIG. 11 is a scanning electron microscope diagram of a flexible solid-state cathode film prepared in Embodiment 2-1 of the present disclosure;

FIG. 12 is a macrophotograph of the flexible solid-state cathode film prepared in Embodiment 2-1 of the present disclosure;

DETAILED DESCRIPTION OF THE PREFERRED EMBODIMENT

[Explanation about Terms]

Figure 1:
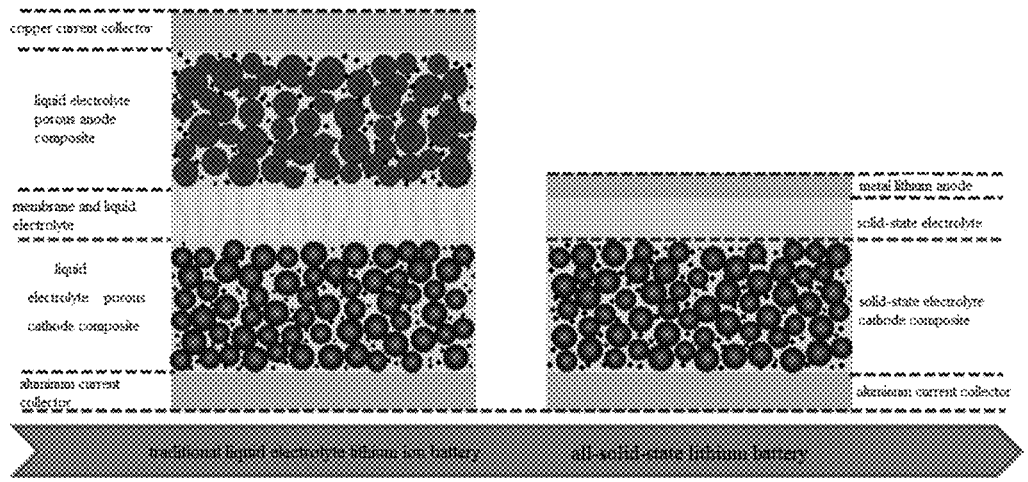
FIG. 1 is a schematic structural comparison diagram of a liquid lithium ion battery and an all-solid-state battery.

In the present disclosure, the specific interfacial area of the organic phase refers to the area of the interface per unit volume of the organic phase. The interface comprises an interface where the organic phase contacts with substances other than the organic phase (including but not limited to atmospheric environment, inorganic particles, or organic materials whose chemical composition is different from the organic phase, etc.), and the interface inside the organic phase (for example, when the organic phase forms a secondary structure from primary structural units such as polymeric fibers, polymeric particles, polymeric slices, etc. in an aggregated, superimposed manner, etc., an interface generated between the primary structural units in contact).

The specific interfacial area of the organic phase is the interfacial area per unit volume of the organic phase, where the interfacial area is the area of the interface described in the present disclosure, and in the present disclosure, the value of the interfacial area is determined by the general calculation method of the interfacial area. For example:

(1) When the organic phase is formed by aggregation of polymeric fibers, the calculation method is as follows:

For polymeric fibers, its model can be regarded as a cylinder.

Its surface area formula is:

$$S = \pi \times d \times l, \qquad \text{Formula (1)}$$

where, $\pi$ is the pi, d is the diameter of the fiber, and l is the length of the fiber.

$$l = V/(\pi \times d^2/4) \qquad \text{Formula (2)}$$

where, V is the volume of the fiber.

So, the surface area $$S = \pi \times d \times V/(\pi d^2/4) \qquad \text{Formula (3)}$$

And $$V = m/\rho \qquad \text{Formula (4)}$$

where, $\rho$ is the density of the polymer, and m is the mass.

So, $$S=\pi \times d \times m/\rho/(\pi d^2/4) \qquad \text{Formula (5)}$$

$$S'=S/V' \qquad \text{Formula (6)}$$

where, V' is the volume of the polymeric fiber film, and S' is the surface area per unit volume, that is, the specific interfacial area.

$$V'=m/\rho' \qquad \text{Formula (7)}$$

So, $$S'=4\rho'/(d \times \rho)$$

where, $\rho'$ is the compacted density of the polymeric fiber film.

(2) When the organic phase is formed by aggregation of polymeric fibers and inorganic particles increasing the specific interfacial area are added, the calculation method is as follows:

When the organic phase is filled with inorganic particles with a high specific interfacial area, the specific interfacial area of the organic phase is the volume-weighted average of the specific interfacial area of the polymeric fibers and the specific interfacial area of the inorganic particles, the specific formula is $S'=(S_1+S_2)/V$, where S' is the specific interfacial area of the organic phase; $S_1$ and $S_2$ respectively are the surface areas of the polymeric fibers and the inorganic particles; V is the volume of the membrane material(s) formed by the composite of the polymeric fibers and the inorganic particles.

For a polymeric fiber, its surface area $S_1=4m_1/(\rho_1 \times d_1)$, where $m_1$ is the mass of the polymeric fiber, $\rho_1$ is the density of the polymeric fiber, and $d_1$ is the diameter of the polymeric fiber.

For inorganic particles, it can be regarded as a sphere, and its surface area $S_2=\pi \times d_2^2 \times n$ where, $\pi$ is the pi, $d_2$ is the diameter of the inorganic particles, and n is the number of inorganic particles. Formula (1)

$$n=m_2/m_0 \qquad \text{Formula (2)}$$

where, $m_2$ is the total mass of inorganic particles and $m_0$ is the mass of a single inorganic particle.

And $$m_0=4/3 \times \pi \times (d_2/2)^3 \times \rho_2, \qquad \text{Formula (3)}$$

where $\rho_2$ is the density

So, $$S_2=\pi \times d_2^2 \times m_2/m_0 \qquad \text{Formula (4)}$$

So, $$S'=(S_1+S_2)/V=[4m_1/(\rho_1 \times d_1)+\pi \times d_2^2 \times m_2/m_0]/V \qquad \text{Formula (5)}$$

And $V=(m1+m2)/\rho'$, where $\rho'$ is the compacted density of the composite material;

So, $S'=[4m_1/(\rho_1 \times d_1)+\pi \times d_2^2 \times m_2/m_0] \times \rho'/(m_1+m_2)$.

(3) When the organic phase is formed by coating a mixture containing polymeric materials, the calculation method is as follows:

For the coated polymeric materials, it can be regarded as a dense film, and its surface area $$S=l \times d \qquad \text{Formula (1)}$$

where, l and d are the length and width of the film, respectively.

Its volume $$V=l \times d \times h \qquad \text{Formula (2)}$$

where, h is the thickness of the film.

So, $$S'=S/V=l/h \qquad \text{Formula (3)}$$

where, S' is the surface area of the polymeric material coated per unit volume, that is, the specific interfacial area.

In the present disclosure, the test method and condition of the conductivity of the solid-state electrolyte are: sputtering 200 nm metal gold on both sides of the solid-state electrolyte for the test of ionic conductivity, wherein the area of gold is 0.28 cm$^2$, and the test is proceeded at room temperature (25° C.).

[Solid-State Electrolyte]

The present disclosure provides a new idea for improving the ionic conductivity of solid-state electrolytes.

The solid-state electrolyte in the form of a flexible thin film provided by the present disclosure comprises membrane material(s) and electrolyte salt(s) dissolved therein. Wherein, the membrane material(s) comprises an organic phase formed by polymeric material(s) and having a three-dimensionally interconnected interface, and by controlling the specific interfacial area of the organic phase to over $1 \times 10^4$ cm$^2$/cm$^3$, the ionic conductivity under room temperature can reach over $10^{-4}$ S/cm. By further increasing the specific interfacial area of the organic phase, the ionic conductivity under room temperature can be further increased to $10^{-3}$ S/cm, or even higher.

The method of obtaining the specific interfacial area comprises optimizing its own structure of the organic phase and adding inorganic particles to the organic phase, and the like.

Organic phases with a high specific interfacial area can be easily obtained by polymeric fiber aggregation, and specifically can be prepared using well-known electrostatic spinning techniques. Organic phases with different specific interfacial areas can be obtained by adjusting the diameter of polymeric fibers and the compact degree of aggregation of polymeric fibers.

The conditions and parameter settings in the preparation of polymeric fibers by electrostatic spinning can be carried out using conventional implementation conditions and are not particularly limited.

In some specific implementation, solution(s) of polymeric material(s) is sprayed onto a selected receiving surface using electrostatic spinning technique to form (that is, form by the aggregation of the polymeric fibers) a continuous three-dimensional structure, which is then treated under pressure to be more dense to obtain a continuous organic phase as the membrane material(s). Wherein, the distance between the electrostatic spinning liquid outlet(s) and the receiving surface can be set to 5 to 30 cm, and the electrostatic voltage can be, for example, 5 to 50 KV. The pressure of the pressure treatment may be 100 KPa to 20 MPa, the time is 1 to 60 minutes, preferably 1 to 10 minutes, and the temperature is 25 to 60° C.

The addition of inorganic particles can further increase the specific interfacial area of the organic phase. Specifically, by adjusting the amount of the added inorganic particles and the size of the inorganic particles, films with different specific interfacial area can be obtained. Generally, the amount of the inorganic particles should be as large as possible, but not so large as to affect the flexibility of the prepared solid-state electrolyte.

There are many approaches for the adding of the inorganic particles, but it is preferable to use the electrostatic spraying method and add it at the same time as the electrostatic spinning, and adding the inorganic particles in such way will not block the continuity of the organic phase interface. This addition method also has the advantage that, compared with other possible addition methods, it can adjust the amount of inorganic particles in a larger range (0 to 95 wt. %), and in this way, the solid-state electrolyte still maintains good flexibility when the content of the added inorganic particles in the solid-state electrolyte exceeds 70%.

In some specific implementations, solution(s) of polymeric material(s) is sprayed onto a selected receiving surface using electrostatic spinning technique to form (that is, form by the aggregation of the polymeric fibers) a continuous three-dimensional structure, and at the same time, dispersion liquid(s) of inorganic particles is sprayed onto the selected receiving surface using electrostatic spraying technique to obtain a composite material constituted by the organic phase composed of the polymeric material(s) and the inorganic particles, then the composite material is treated under pressure to be more dense to serve as the membrane material(s), wherein the distance between the electrostatic spinning liquid outlet(s) and the receiving surface can be set to 5 to 30 cm, and the electrostatic voltage can be, for example, 5 to 50 KV. The pressure of the pressure treatment may be 100 KPa to 20 MPa, the time is 1 to 60 minutes, preferably 1 to 10 minutes, and the temperature is 25 to 60° C. As one of the preferred implementations, the preparation method comprises: at a pressure of 100 KPa to 20 MPa, the film collected from the receiving surface is placed on a rolling machine and repeatedly rolled.

Specifically, the flow ratio of the polymeric solution to the inorganic particle dispersion liquid is 100:1 to 1:100, preferably 1:10 to 1:50, and particularly preferably 1:3 to 1:7. Flexible films with different contents of the solid-state electrolyte can be prepared by controlling the flow velocity ratio of spinning and spraying.

In the foregoing implementations, the polymeric fiber is formed into a dense continuous organic phase by pressure treatment, and then the electrolyte salt(s) is added, which can greatly reduce the use level of the electrolyte salt(s) and further greatly improve the ionic conductivity of the organic polymeric solid-state electrolyte.

Moreover, preferably, the electrostatic spinning liquid outlet(s) for spraying the solution(s) of the polymeric material(s) and the electrostatic spraying liquid outlet(s) for spraying the dispersion liquid(s) of the inorganic particles are arranged side by side in parallel, and the spraying direction of the electrostatic spinning liquid outlet(s) and the spraying direction of the electrostatic spraying liquid outlet(s) form an angle greater than or equal to 0 and less than 90°.

Further, the shape of the electrostatic spinning liquid outlet(s) and/or the electrostatic spraying liquid outlet(s) comprise a circular shape or a slit shape, preferably a slit shape, wherein the slit type has a higher productivity. The liquid outlet(s) with a slit structure can make the distribution of the polymeric solution and the inorganic particle dispersion liquid sprayed on the receiving surface more even.

Preferably, the inorganic particle dispersion liquid(s) further contains surfactant(s) to prevent the inorganic particles from depositing in the dispersion liquid, which may cause clogging of the electrostatic spraying liquid outlet(s) and uneven spraying, thereby affecting the evenness and performance of the formed solid-state electrolyte film. The surfactant(s) may be selected from, but not limited to, the group consisting of ionic surfactants such as cationic surfactants and anionic surfactants, non-ionic surfactants, amphoteric surfactants, compound surfactants and other surfactants. The content of the surfactant(s) in the dispersion liquid of inorganic particles is generally 0.1 to 1 wt. %.

Further, an external electric field is applied between the receiving surface and the electrostatic spinning liquid outlet(s) and/or the electrostatic spraying liquid outlet(s), and under the action of the external electric field, the polymeric solution is sprayed onto the receiving surface using electrostatic spinning technique, and the dispersion liquid(s) of the inorganic particles is sprayed onto the receiving surface using electrostatic spraying technique. In some embodiments, the receiving surface is the surface of the receiving device. The receiving surface is selected from, but not limited to, the group consisting of drum receiving devices, flat receiving devices, aqueous solution receiving devices, and combinations thereof. The receiving device may be provided with a negative charge generator.

Further, when spraying the polymeric solution(s) and the dispersion liquid(s) of the inorganic particles to the receiving surface, the electrostatic spinning liquid outlet(s) and the electrostatic spraying liquid outlet(s) move back and forth relative to the receiving surface along the axial direction, length direction or width direction of the receiving device.

Furthermore, the receiving surface is arranged at a set angle, for example, 0 to 89.9° with the electrostatic spinning liquid outlet(s) and the electrostatic spraying liquid outlet(s).

In some embodiments, when the polymeric solution(s) and the dispersion liquid(s) of the inorganic particles are sprayed to the surface of the drum of the drum receiving device, the drum maintains a rotating state (rotation speed, for example, 300 to 1000 rpm). A thin film can be obtained after maintaining the above working state for a period of time, and the resulting product can be easily peeled off from the drum.

In the present disclosure, specific optional polymeric materials comprise, but are not limited to, polyacrylonitrile (PAN), polyvinylpyrrolidone (PVP), polymethyl methacrylate (PMMA), polyvinylidene fluoride (PVDF), polytetrafluoroethylene (PTFE), polyethylene oxide, polypropylene oxide, poly(ethylene succinate), polyethylene sebacate, polyethylene glycol, polyethylene glycol diamine, which prefers those having a better ability to dissolve electrolyte salt(s)s and better mechanical and electrical properties.

The method for preparing the polymeric solution(s) usually is dissolving the polymeric material(s) in a corresponding solvent(s). For example, for the above polymeric materials, the optional solvent(s) comprises all liquids that can dissolve the above polymeric materials, for example, is selected from, but not limited to, the group consisting of water, N-methylpyrrolidone, all alcohol liquid(s) such as ethanol, N,N-dimethylformamide, dimethyl sulfoxide, dimethylacetamide and combinations thereof.

In the present disclosure, specific optional inorganic particles comprise, but are not limited to, inorganic non-ionic conductors such as all oxides, sulfides, nitrides, fluorides, chlorides and carbides, etc., as well as inorganic ion conductors such as lithium ion conductors, magnesium ion conductors, and aluminum ion conductors, etc. The solvent(s) for preparing the dispersion liquid(s) of the inorganic particles may specifically be selected from, but not limited to, the group consisting of water, alcohol liquids such as ethanol and isopropanol, ketone liquids such as acetone, and combinations thereof.

After obtaining a membrane material(s) with a high specific interfacial area as described above, the membrane material(s) is infiltrated by the solution(s) of electrolyte salt(s) in any manner of liquid dropping and spraying or the membrane material(s) is immersed in the solution(s) of electrolyte salt(s), and then dried at high temperature to remove the solvent(s), to give the desired solid-state electrolyte. The required ratio of the electrolyte salt(s) to the organic phase can be obtained by adjusting the concentration of the solution(s) of electrolyte salt(s), the time of immersion and the external conditions during immersion, such as vacuum, pressurization, etc. For example, in some implementations, the solid-state electrolyte is immersed with solution(s) of electrolyte salt(s) for a period of 1 minute to 24 hours, preferably 5 to 10 minutes, and then dried.

The solid-state electrolyte in the form of a flexible film prepared in the above manner implements the complementary advantages of inorganic electrolytes and organic electrolytes, that is, it has both conductivity comparable to that of inorganic electrolyte conductors and good processing performance More specifically, the existing inorganic electrolyte conductors have high conductivity, generally up to $1.6 \times 10^{-3}$ S/cm, but the thickness thereof is generally in the order of millimeters, so the conductivity per unit area is low, and the processing performance is poor, in contrast, in the condition that the solid-state electrolyte provided by the present disclosure is processed to be very thin (5-20 μm), it can obtain extremely high electrical conductivity per unit area, and can maintain good mechanical integrity and have high flexibility, does not break when bent, has a good processability, and meanwhile, when compared with the organic electrolyte, the solid-state electrolyte provided by the present disclosure has a high mechanical moduli to suppress dendrites, and maintains the morphology after combustion to ensure that the cathode and the anode do not contact directly to cause internal short circuits, so with high safety.

The solid-state electrolyte film provided by the present disclosure has the following performance characteristics: 1) high ionic conductivity (meeting the application requirements of electrochemical devices); 2) it has special mechanical properties and can still maintain mechanical integrity even when it is processed into a very thin film, does not break when bent, and has good processability; 3) it exhibits good electrochemical performance in secondary battery applications.

With the above technical solution, the solid-state electrolyte of the present disclosure has a simple preparation process, can be prepared in batches and has low raw material cost, mild process conditions, does not need expensive production equipment, has a high yield, and can be adjusted, and has good repeatability and stability, is suitable for different battery systems and provides a good idea for the research and development of all-solid-state batteries.

In addition, because the spun fiber has good flexibility, it can also ensure that the film prepared by this method is also flexible, and flexible films with different contents of the solid-state electrolyte can be prepared by controlling the flow velocity ratio of spinning and spraying. For this system, using the characteristics of easy process and easy control of the preparation process, a flexible solid-state electrolyte film can be realized.

[Cathode of Solid-state Battery]

Some implementations of the present disclosure provide a solid-state cathode comprising a cathode current collector coated by a solid-state cathode composite material.

Further, the cathode current collector comprises any one of aluminum foil, carbon-coated aluminum foil, carbon felt, and carbon paper, but is not limited thereto.

Further, the solid-state cathode composite material is evenly coated on the surface of the cathode current collector, and the thickness of the solid-state cathode composite material is 30 to 500 μm, preferably 50 to 300 μm, further preferably 150 to 250 μm, and the ionic conductivity at 25° C. is $1.0 \times 10^{-4}$ to $1.0 \times 10^{-2}$ S/cm.

Some implementations of the present disclosure provide a solid-state cathode composite material, comprising:
  a continuous organic phase, formed by the aggregation of organic fiber material(s) with at least ion conductor function;
  cathode active material(s), distributed in pores contained in the continuous organic phase;
  electrolyte salt(s), dissolved in the continuous organic phase;
  electronic conductor additive(s) optionally added or not, dispersively distributed in the solid-state cathode composite material; and,
  inorganic ionic conductor additive(s) optionally added or not, dispersively distributed in the solid-state cathode composite material;
  and, the solid-state cathode composite material is in the form of a flexible film and has a thickness of 30 to 500 μm.

The continuous organic phase can be obtained according to the method of the organic phase of the solid-state electrolyte described above.

An aspect of an embodiment of the present disclosure provides a solid-state cathode composite material, which is mainly formed by treating the composite material under pressure and then immersing with solution(s) of electrolyte salt(s);

The composite material comprises:
  an organic phase, the organic phase is a continuous two-dimensional or three-dimensional structure formed by spraying the polymeric solution solution(s) onto a selected receiving surface using electrostatic spinning technique, the organic fiber material(s) at least has an ionic conductor function;
  at the time of spraying the polymeric solution(s), dispersion liquid(s) of cathode active material(s) or mixed dispersion liquid(s) of cathode active material(s) and electronic conductor additive(s) and/or inorganic ion conductor additive(s) is sprayed onto the selected receiving surface using an electrostatic spraying technique to form a network structure,
  wherein, the cathode active material(s) is distributed in pores contained in the continuous organic phase, and the solution(s) of electrolyte salt(s) is dissolved in the organic phase;
  wherein, if the electronic conductor additive(s) and/or the inorganic ion conductor additive(s) are present, the electronic conductor additive(s) and/or the inorganic ion conductor additive(s) are dispersively distributed in the solid-state cathode composite material;
  and the solid-state cathode composite material is in the form of a flexible film and has a thickness of 30 to 500 μm.

In some preferred implementations, the solid-state cathode composite material comprises:
  a continuous two-dimensional or three-dimensional structure mainly formed by compact aggregation of the organic fiber material(s);

cathode active material(s) dispersed in the two-dimensional or three-dimensional structure; and,
electrolyte salt(s) dissolved in the organic phase.

In some implementations, the organic fiber material(s) further has an electronic conductor function. Correspondingly, the solid-state cathode composite material may comprise only the cathode active material(s), the organic fiber material(s) and the electrolyte salt(s).

In some other implementations, although the organic fiber material(s) also has an electronic conductor function, but the solid-state cathode composite material may further comprise electronic conductor additive(s) and/or inorganic ion conductor additive(s) and the like, to further improve the properties of the solid-state cathode composite material. These electronic conductor additive(s) and/or inorganic ion conductor additive(s) may be dispersively distributed in the solid-state cathode composite material.

In some implementations, the organic fiber material(s) only has an ion conductor function. Correspondingly, the solid-state cathode composite material may comprise cathode active material(s), electronic conductor additive(s), organic fiber material(s) and electrolyte salt(s). The electronic conductor additive(s) may be dispersively distributed in the solid-state cathode composite material.

In some implementations of the present disclosure, the organic fiber material(s) only has an ion conductor function, and the solid-state cathode composite material may comprise cathode active material(s), electronic conductor additive(s), inorganic ion conductor additive(s), organic fiber material(s) and an electrolyte salt(s). The electronic conductor additive(s) and inorganic ion conductor additive(s) may be dispersively distributed in the solid-state cathode composite material.

In some preferred implementations, the thickness of the solid-state cathode composite material is 30 to 500 µm, preferably 50 to 300 µm, especially preferably 150 to 250 µm.

Further, the ionic conductivity of the solid-state cathode composite material is $1.0 \times 10^{-4}$ to $1.0 \times 10^{-2}$ S/cm. Further, the ionic conductivity of the solid-state cathode composite material at 25° C. is $1.0 \times 10^{-4}$ to $1.0 \times 10^{-2}$ S/cm.

Further, the density of the solid-state cathode composite material is 1 to 5 $g/cm^3$.

Further, the flexural strength of the solid-state cathode composite material is 1 to 20 MPa.

Preferably, the mass ratio of the electrolyte salt(s) to the organic fiber material in the solid-state cathode composite material is 1:2 to 1:10, preferably 1:3 to 1:6.

Preferably, the content of the electrolyte salt(s) in the solid-state cathode composite material is 1 to 10 wt. %, preferably 1 to 5 wt. %.

Preferably, the electrolyte salt(s) may be selected from the group consisting of lithium bis(trifluoromethanesulfonyl) imide (LiTFSI), lithium perchlorate ($LiClO_4$), lithium hexafluoroarsenate ($LiAsF_6$), lithium hexafluorophosphate ($LiPF_6$), and combinations thereof, or may be a lithium salt of a small molecule polymer, such as lithium succinonitrile-bis(trifluoromethanesulfon)imide, but is not limited thereto In addition, the electrolyte salt(s) may be those used in the secondary metal battery, such as sodium salts, magnesium salts or aluminum salts, etc.

In some embodiments, the diameter of the organic fiber material(s) in the solid-state cathode composite material is 50 nm to 2 µm, preferably 100 nm to 1 µm, further preferably 150 nm to 800 nm, and especially preferably 300 nm to 600 nm.

Preferably, the content of the organic fiber material(s) in the solid-state cathode composite material is 5 to 60 wt. %, preferably 10 to 20 wt. %.

In some embodiments, the organic fiber material(s) comprises polymer(s) and at least has an ion conductor function.

Preferably, the polymer(s) may be selected from, but not limited to, the group consisting of polyacrylonitrile (PAN), polyethylene oxide, polyvinylpyrrolidone (PVP), polyethylene glycol, polymethyl methacrylate (PMMA), polyvinylidene fluoride (PVDF), polytetrafluoroethylene (PTFE), and combinations thereof.

More preferably, the organic fiber material(s) comprises polymer(s) formed by blending and grafting conductive polymer(s) and an ion-conducting polymer(s), and has the functions of both ion and electron conductors.

In some preferred implementations, the content of the cathode active material(s) in the solid-state cathode composite material is 30 to 95 wt. %, preferably 50 to 90 wt. %, further preferably 60 to 80 wt. %, and especially preferably 70 to 80 wt. %. In the present disclosure, when the content of the cathode active material particles is above 70 wt. %, the solid-state cathode composite material can still have a good flexibility.

In some embodiments, the particle size of the inorganic cathode active material particles is 2 nm to 20 µm, preferably 5 nm to 1 µm, further preferably 10 nm to 1 µm, and especially preferably 20 nm to 1 µm.

In some preferred embodiments, the material of the cathode active material(s) may be selected from the group consisting of precursors of oxide cathode materials, sulfide cathode materials, polyanion cathode materials, and combinations thereof, or may be selected from the group consisting of all cathode materials suitable for the secondary batteries, such as cathode materials of sodium ion batteries, cathode materials of magnesium ion batteries, cathode materials of aluminum ion batteries, and the precursors thereof.

Preferably, the material of the cathode active material(s) is selected from, but not limited to, the group consisting of lithium iron phosphate, lithium manganate oxide, lithium cobalt oxide, lithium nickel-cobalt-manganate oxide (Li($NiCoMn)O_2$), lithium nickel-manganate oxide, and combinations thereof.

In some embodiments, the content of the electronic conductor additive(s) in the solid-state cathode composite material is 0 to 50 wt. %, preferably 0 to 20 wt. %, and further preferably 0 to 10 wt. %.

Further, the electronic conductor additive(s) is selected from, but not limited to, the group consisting of acetylene black, Super P conductive carbon black, Ketjen black, carbon nanotubes, carbon fiber, conductive graphite, and combinations thereof.

In some embodiments, the content of the inorganic ion conductor additive(s) in the solid-state cathode composite material is 0 to 70 wt. %, preferably 0 to 40 wt. %, and further preferably 0 to 20 wt. %.

Further, the inorganic ion conductor additive(s) comprises a lithium ion conductor additive, a sodium ion conductor additive, a magnesium ion conductor additive, or an aluminum ion conductor additive, wherein the lithium ion conductor additive is selected from, but not limited to, the group consisting of NASICON type lithium ceramic electrolyte, perovskite type lithium ceramic electrolytes, garnet-type lithium ceramic electrolytes, LISICON-type lithium ceramic electrolytes, $Li_3N$type lithium ceramic electrolytes, lithiated $BPO_4$ lithium ceramic electrolytes, and $Li_4SiO_4$-based lithium ceramic electrolytes, and combinations thereof, for example, it may be lithium lanthanum zirconium tantalum oxide (LLZTO).

The additive amount of the cathode active material(s) in the solid-state cathode composite material of the present disclosure may be greater than 70 wt. %, and its addition can strengthen the dissociation of the electrolyte salt(s), increase the free volume of the organic phase, reduce the crystallinity, and thereby extend the cycle life of the lithium ion battery, and improve the coulombic efficiency of the battery. At meanwhile, with the addition of the cathode active material(s), the organic fiber material(s), the cathode active material(s) and the electrolyte salt(s) of the solid-state cathode composite material of the present disclosure can cooperate with each other to further improve the ionic conductivity of the solid-state cathode composite material, showing good electrochemical performance in secondary battery applications.

Preferably, the solid-state cathode composite material is in the form of a flexible film.

In some implementations of the present disclosure, the organic fiber material(s) further has an electronic conductor function. Correspondingly, the solid-state cathode composite material may comprise only the cathode active material(s), the organic fiber material(s) and the electrolyte salt(s).

In some other implementations, although the organic fiber material(s) also has an electronic conductor function, but the solid-state cathode composite material may further comprise electronic conductor additive(s) and/or inorganic ion conductor additive(s) and the like, to further improve the properties of the solid-state cathode composite material. These electronic conductor additive(s) and/or inorganic ion conductor additive(s) may be dispersively distributed in the solid-state cathode composite material.

In some implementations of the present disclosure, the organic fiber material(s) has only an ionic conductor function. Correspondingly, the solid-state cathode composite material may comprise cathode active material(s), electronic conductor additive(s), organic fiber material(s) and electrolyte salt(s). The electronic conductor additive may be dispersively distributed in the solid-state cathode composite material.

In some implementations of the present disclosure, the organic fiber material(s) only has an ion conductor function, and the solid-state cathode composite material may comprise cathode active material(s), electronic conductor additive(s), inorganic ion conductor additive(s), organic fiber material(s) and electrolyte salt(s). The electronic conductor additive(s) and inorganic ion conductor additive(s) may be dispersively distributed in the solid-state cathode composite material.

Preferably, the flow ratio of the polymeric solution(s) to the dispersion liquid(s) of the cathode active material(s) or the mixed dispersion liquid(s) is 100:1 to 1:100, preferably 1:10 to 1:50, and particularly preferably 1:5 to 1:7. The present disclosure may prepare flexible films with different contents of the solid-state electrolyte by controlling the flow velocity ratio of spinning and spraying.

The pressure of the pressure treatment may be 100 KPa to 20 MPa, the time is 1 to 60 minutes, preferably 1 to 10 minutes, and the temperature is 25 to 60° C.

The immersing time may be 1 minute to 24 hours, preferably 5 to 10 minutes.

Preferably, the solid-state cathode composite material is thin film-like, especially a flexible thin-film.

In summary, the addition of the organic fiber material(s) to the solid-state cathode composite material of the present disclosure gives the cathode material(s) flexibility, which can be very thin (10-20 microns) and maintain good integrity and processing performance. And, the inorganic material(s) can effectively inhibit the growth of lithium dendrites in energy storage devices such as lithium ion batteries, thereby extending the cycle life of such devices and improving the coulombic efficiency of the batteries.

The solid-state cathode composite material mentioned above has the following performance characteristics: 1) high ionic conductivity (meeting the application requirements of electrochemical devices); 2) it has special mechanical properties and can still maintain mechanical integrity even when it is processed into a very thin film, does not break when bent, and has good processability; 3) it exhibits good electrochemical performance in secondary battery applications.

Another aspect of an embodiment of the present disclosure provides a preparation method of a solid-state cathode composite material, comprising:

spraying polymeric solution(s) (which may be referred to as solution 1) onto a selected receiving surface using electrostatic spinning technique to form a continuous two-dimensional or three-dimensional structure, the organic fiber material(s) at least has an ionic conductor function;

at the time of spraying the polymeric solution(s), spraying dispersion liquid(s) of cathode active material(s) or mixed dispersion liquid(s) of cathode active material(s) and electronic conductor additive(s) and/or an inorganic ion conductor additive(s) (which may be referred to as solution 2) onto the selected receiving surface using an electrostatic spraying technique, and then treating the obtained composite material under pressure to densify it and distribute the cathode active material(s) in pores contained in the continuous organic phase, immersing the composite material in the solution(s) of electrolyte salt(s) to cause the electrolyte salt(s) getting inside the organic fiber material(s) and the pores contained in a network structure formed by the organic fiber material(s) and the cathode active material(s) in the composite material, to form the solid-state cathode composite material;

wherein, if the electronic conductor additive(s) and/or the inorganic ion conductor additive(s) is present, the electronic conductor additive(s) and/or the inorganic ion conductor additive(s) are dispersively distributed in the solid-state cathode composite material;

and, the solid-state cathode composite material is in the form of a flexible film and has a thickness of 30 to 500 μm.

In the foregoing implementations, the organic fiber material(s) is formed into a dense continuous organic phase by pressure treatment, and then the electrolyte salt(s) is added, which can greatly reduce the use level of the electrolyte salt(s) and further greatly improve the ionic conductivity of the organic polymeric solid-state cathode composite material.

Preferably, the solid-state cathode composite material is thin film-like, especially in the form of flexible thin-film.

The electrostatic spinning technique and electrostatic spraying technique are all known techniques. When the preparation of the organic phase of the solid-state cathode composite material is implemented, it can be specifically set as follows.

The distance between the electrostatic spinning liquid outlet(s) and the receiving surface is 5 to 30 cm, and the electrostatic voltage is 5 to 50 KV.

In the electrostatic spraying technique, the distance between the electrostatic spraying liquid outlet(s) and the receiving surface is 5 to 30 cm, and the electrostatic voltage is 5 to 50 KV.

In some embodiments, the electrostatic spinning liquid outlet(s) for spraying the polymeric solution(s) and the electrostatic spraying liquid outlet(s) for spraying the dispersion liquid(s) of the cathode active material(s) or the mixed dispersion liquid(s) are arranged side by side in parallel. The spraying direction of the electrostatic spinning liquid outlet(s) and the spraying direction of the electrostatic spraying liquid outlet(s) form an angle greater than or equal to 0 and less than 90°.

In some embodiments, the spraying direction of the electrostatic spinning liquid outlet(s) and the spraying direction of the electrostatic spraying liquid outlet(s) form an angle greater than or equal to 0 and less than 90°.

The shape of the electrostatic spinning liquid outlet(s) and/or the electrostatic spraying liquid outlet(s) comprise a circular shape or a slit shape, preferably a slit shape, wherein the slit type has a higher productivity. The liquid outlet(s) adopting a slit structure can make the distribution of the polymeric solution and the dispersion liquid of the cathode active material or the mixed dispersion liquid sprayed on the receiving surface more even.

In some embodiments, the dispersion liquid(s) of the cathode active material(s) or the mixed dispersion liquid(s) further contains surfactant(s) to prevent the cathode active material(s) from depositing in the dispersion liquid(s), which may cause clogging of the electrostatic spraying liquid outlet(s) and uneven spraying, thereby affecting the evenness and performance of the formed solid-state cathode film. Generally, the content of the surfactant(s) in the dispersion liquid(s) of the cathode active material(s) or the mixed dispersion liquid(s) is 0.1 to 1 wt. %. The surfactant(s) may be selected from, but not limited to, the group consisting of ionic surfactants such as cationic surfactants and anionic surfactants, non-ionic surfactants, amphoteric surfactants, compound surfactants and other surfactants.

Specifically, an external electric field is applied between the receiving surface and the electrostatic spinning liquid outlet(s) and/or the electrostatic spraying liquid outlet(s), and under the action of the external electric field, the polymeric solution(s) is sprayed onto the receiving surface using electrostatic spinning technique, and the dispersion liquid of the cathode active material(s) or the mixed dispersion liquid(s) is sprayed onto the receiving surface using electrostatic spraying technique.

In some embodiments, the receiving surface is the surface of the receiving device. The receiving surface is selected from, but not limited to, the group consisting of drum receiving devices, flat receiving devices, aqueous solution receiving devices, and combinations thereof. In some embodiments, the receiving device may be provided with a negative charge generator.

Further, when spraying the polymeric solution(s) and the dispersion liquid(s) of the cathode active material(s) or the mixed dispersion liquid(s) to the receiving surface, the electrostatic spinning liquid outlet(s) and the electrostatic spraying liquid outlet(s) move back and forth relative to the receiving surface along the axial direction of the receiving device, or length direction or width direction of the receiving surface.

Furthermore, the receiving surface is arranged at a set angle, for example, 0 to 89.9° with the electrostatic spinning liquid outlet and the electrostatic spraying liquid outlet.

In some embodiments, when the polymeric solution(s) and the dispersion liquid(s) of the cathode active material(s) or the mixed dispersion liquid(s) are sprayed to the surface of the drum of the drum receiving device, the drum maintains a rotating state (rotation speed, for example, 300 to 1000 rpm). A thin film can be obtained after maintaining the above working state for a period of time, and the resulting product can be easily peeled off from the drum.

Specifically, the solvent(s) for dissolving the polymer comprises all liquids that can dissolve the above polymer, for example selected from, but not limited to, the group consisting of water, N-methylpyrrolidone, all alcohol liquid such as ethanol, N,N-dimethylformamide, dimethyl sulfoxide, dimethylacetamide and combinations thereof.

The solvent(s) for dispersing the cathode active material(s), the electronic conductor additive(s) and the inorganic ion conductor additive(s) and the may be selected from, but not limited to, the group consisting of water, alcohol liquids such as ethanol and isopropanol, ketone liquids such as acetone, and combinations thereof.

[Anode of Solid-state Battery]

Some implementations of the present disclosure provide a solid-state anode comprising an anode current collector coated by a solid-state anode composite material.

An aspect of an embodiment of the present disclosure provides a solid-state anode composite material, comprising:
  a continuous organic phase, formed by the aggregation of organic fiber material(s) with at least ion conductor function;
  anode active material(s), distributed in pores contained in the continuous organic phase;
  electrolyte salt(s), dissolved in the organic phase;
  electronic conductor additive(s) optionally added or not, dispersively distributed in the solid-state anode composite material; and,
  inorganic ionic conductor additive(s) optionally added or not, dispersively distributed in the solid-state anode composite material;
  and, the solid-state anode composite material is in the form of a flexible film and has a thickness of 30 to 500 μm.

Wherein, the specific implementations of the continuous organic phase, the electrolyte salt(s), the electronic conductor additive(s), the inorganic ion conductor additive(s) and the like may be completely the same as those described in the foregoing cathode of the solid-state battery. The preparation method and conditions of the solid-state anode composite material can also refer to the aforementioned description of the cathode of the solid-state battery.

In some preferred implementations, the thickness of the solid-state anode composite material is 30 to 500 μm, preferably 50 to 300 μm, especially preferably 150 to 250 μm.

Further, the ionic conductivity of the solid-state anode composite material is $1.0 \times 10^{-4}$ to $1.0 \times 10^{-2}$ S/cm.

Further, the ionic conductivity of the solid-state anode composite material at 25° C. is $1.0 \times 10^{-4}$ to $1.0 \times 10^{-2}$ S/cm.

Further, the density of the solid-state anode composite material is 0.5 to 5 $g/cm^3$.

Further, the flexural strength of the solid-state anode composite material is 1 to 20 MPa.

In some preferred implementations, the mass ratio of the electrolyte salt(s) to the organic fiber material in the solid-state anode composite material is 1:2 to 1:10, preferably 1:3 to 1:6.

Further, the content of the electrolyte salt(s) in the solid-state anode composite material is 1 to 10 wt. %, preferably 1 to 5 wt. %.

In some preferred implementations, the content of the anode active material in the solid-state anode composite material is 30 to 95 wt. %, preferably 50 to 90 wt. %, further preferably 60 to 80 wt. %, and especially preferably 70 to 80 wt. %. In the present disclosure, when the content of the anode active material particles is above 70 wt. %, the solid-state anode composite material can still have a good flexibility.

In some embodiments, the particle size of the inorganic anode active material particles is 2 nm to 20 μm, preferably 5 nm to 10 μm, further preferably 10 nm to 1 μm, and especially preferably 20 nm to 1 μm.

In some preferred embodiments, the material of the anode active material may be carbon material anode or non-carbon material or combinations thereof, wherein the non-carbon material may be tin-based materials, silicon-based materials, titanium-based materials, oxide anode materials, or nitride anode materials, etc., and the anode materials may be selected from, but not limited to, the group consisting of all anode materials suitable for the secondary batteries, such as anode materials of lithium ion batteries, anode materials of sodium ion batteries, anode materials of magnesium ion batteries, anode materials of aluminum ion batteries, and/or the precursors thereof.

Preferably, the material of the anode active material is selected from, but not limited to, the group consisting of lithium titanate, graphene, nano silicon, graphite, molybdenum oxide, and combinations thereof.

In some embodiments, the content of the electronic conductor additive in the solid-state anode composite material is 0 to 50 wt. %, preferably 0 to 20 wt. %, and further preferably 0 to 10 wt. %.

[All-Solid-State Battery]

The all-solid-state battery of the present disclosure may be a lithium ion battery, a sodium ion battery, a potassium ion battery, an aluminum ion battery, a magnesium ion battery, an iron ion battery, a zinc ion battery, or the like.

According to some embodiments of the present disclosure, an all-solid-state battery includes a cathode, an anode, and the solid-state electrolyte of the present disclosure, wherein the cathode is formed by coating cathode active material(s) and a solid-state electrolyte composite on a cathode current collector, wherein the solid-state electrolyte is an organic polymeric composite lithium salt and/or a low-melting solid-state electrolyte; the organic polymeric composite lithium salt is polyethylene oxide composite lithium salt, polyvinylidene fluoride-hexafluoropropylene composite lithium salt, polyoxymethylene resin composite lithium salt, polyvinyl chloride composite lithium salt, polypropylene composite lithium salt, or polycarbonate composite lithium salt; the low-melting solid-state electrolyte is an anti-perovskite-structure solid-state electrolyte $Li_{3-x}A_xBC$, where A is an alkaline-earth metal element, B is an oxygen group element, and C is a halogen element or ion cluster. The anode is formed by coating an anode active material and a solid-state electrolyte composite on an anode current collector, wherein the solid-state electrolyte is an organic polymeric composite lithium salt and/or a low-melting solid-state electrolyte; the organic polymeric composite lithium salt is polyethylene oxide composite lithium salt, polyvinylidene fluoride-hexafluoropropylene composite lithium salt, polyoxymethylene resin composite lithium salt, polyvinyl chloride composite lithium salt, polypropylene composite lithium salt, or polycarbonate composite lithium salt; the low-melting solid-state electrolyte is an anti-perovskite-structure solid-state electrolyte $Li_{3-x}A_xBC$, where A is an alkaline-earth metal element, B is an oxygen group element, and C is a halogen element or ion cluster. The composite of the cathode active material and the solid-state electrolyte, and the composite of the anode active material and the solid-state electrolyte are prepared according to the prior art.

According to some other specific implementations of the present disclosure, the all-solid-state battery includes a cathode, an anode, and the solid-state electrolyte of the present disclosure, wherein the cathode is a solid-state cathode above prepared by the present disclosure (that is, formed by coating the cathode current collector with the flexible film-like solid-state cathode composite material), and the anode is composed of an anode current collector coated with the anode active material and the solid-state electrolyte composite. Wherein, the composite of the anode active material and the solid-state electrolyte may be prepared according to solutions of the prior art.

According to still other specific implementations of the present disclosure, the all-solid-state battery includes a cathode, an anode, and the solid-state electrolyte of the present disclosure, wherein the cathode is formed by coating the cathode current collector with the composite of the cathode active material and the solid-state electrolyte, and the anode is a solid-state anode above prepared by the present disclosure (that is, formed by coating the anode current collector with the flexible film-like solid-state anode composite material). The composite of the cathode active material and the solid-state electrolyte may be prepared according to solutions of the prior art.

According to yet other specific implementations of the present disclosure, the all-solid-state battery includes a cathode, an anode, and the solid-state electrolyte of the present disclosure, wherein the cathode is a solid-state cathode above prepared by the present disclosure (that is, formed by coating the cathode current collector with the flexible film-like solid-state cathode composite material), and the anode also is a solid-state anode above prepared by the present disclosure (that is, formed by coating the anode current collector with the flexible film-like solid-state anode composite material).

In the following, the technical solutions of the present disclosure will be described clearly and completely, and obviously, the described embodiments are a part of the embodiments of the present disclosure, not all the embodiments. Based on the embodiments of the present disclosure, all other embodiments obtained by a person of ordinary skill in the art without creative work fall within the protection scope of the present disclosure. Unless otherwise specified, the experimental means or test means not specified in the following embodiments of the present disclosure are conventional means in the art.

EMBODIMENT 1-1

About 1 g of commercially available polyacrylonitrile (PAN) powder was dissolved in 7 g of N,N-dimethylformamide (DMF) to obtain a polyacrylonitrile solution. Then, spinning was carried out at an electrostatic voltage of 15 KV, the distance between the sprayer and the drum receiving device was 15 cm, and the flow rate of the polyacrylonitrile solution was 15 μL/min, and after working in this way for about 5 hours, a flexible polymeric thin film was peeled off the drum receiving device, and then was rolled at about 2 MPa for about 10 minutes, then immersed in a 1 mol/L lithium perchlorate/ethanol solution for 5 minutes, and then vacuum dried to remove the solvent to obtain a sheet of solid-state electrolyte with a thickness of 20 μm and a polymer/lithium salt mass ratio of 2:1, and the density thereof was measured to be 1.9 g/cm$^3$.

Figure 2:
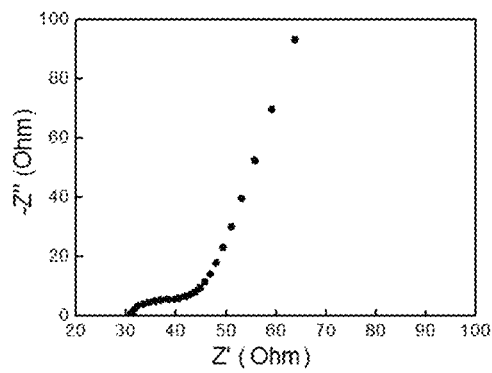
FIG. 2 is an electrochemical impedance diagram of a solid-state electrolyte formed by immersing polyacrylonitrile fibers prepared by electrostatic spinning in a lithium salt in Embodiment 1-1 of the present disclosure.

According to the calculation method of the specific interfacial area described above in the present disclosure, the specific interfacial area of the solid-state electrolyte was about 1×10$^5$ cm$^2$/cm$^3$. The ionic conductivity of the solid-state electrolyte was tested to be 2.3×10$^{-4}$ S/cm. The electrochemical impedance of the solid-state electrolyte was tested and the results are shown in FIG. 2.

Control 1-1

1 g of commercially available polyacrylonitrile (PAN) and lithium perchlorate in a mass ratio of 2:1 were dissolved into 10 g of DMF solvent, stirred evenly for a long time, and then blade coated to obtain a solid-state electrolyte thin film with a thickness of 20 μm.

According to the calculation method of the specific interfacial area described in the present disclosure, the specific interfacial area of this solid-state electrolyte was about 500 cm$^2$/cm$^3$. The ionic conductivity of the solid-state electrolyte was tested to be 1.2×10$^{-7}$ S/cm.

EMBODIMENT 1-2

About 1 g of commercially available polymethyl methacrylate (PMMA) powder was dissolved in 9 g of DMF to obtain a polymethyl methacrylate solution. Then, spinning was carried out at an electrostatic voltage of 15 KV, the distance between the sprayer and the drum receiving device was 15 cm, and the flow rate of the polymethyl methacrylate solution was 15 μL/min, and after working in this way for about 7 hours, a flexible polymeric thin film was peeled off from the drum receiving device, and then was rolled at about 2 MPa for about 10 minutes, then immersed in a 1 mol/L lithium hexafluorophosphate/ethanol solution for 5 minutes, and then vacuum dried to remove the solvent to obtain a sheet of solid-state electrolyte with a thickness of 30 μm and a polymer/lithium salt mass ratio of 4:1, and the density thereof was measured to be 2.2 g/cm$^3$.

Figure 3:
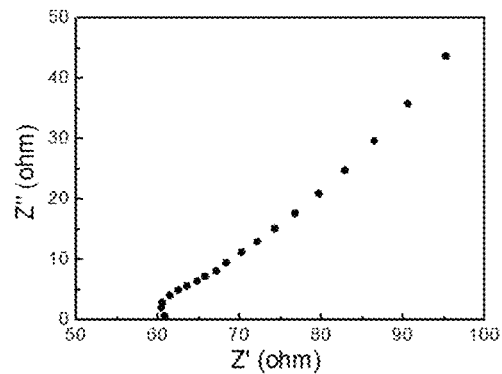
FIG. 3 is an electrochemical impedance diagram of a solid-state electrolyte formed by immersing polymethyl methacrylate fibers prepared by electrostatic spinning in a lithium salt in Embodiment 1-2 of the present disclosure.
Figure 4:
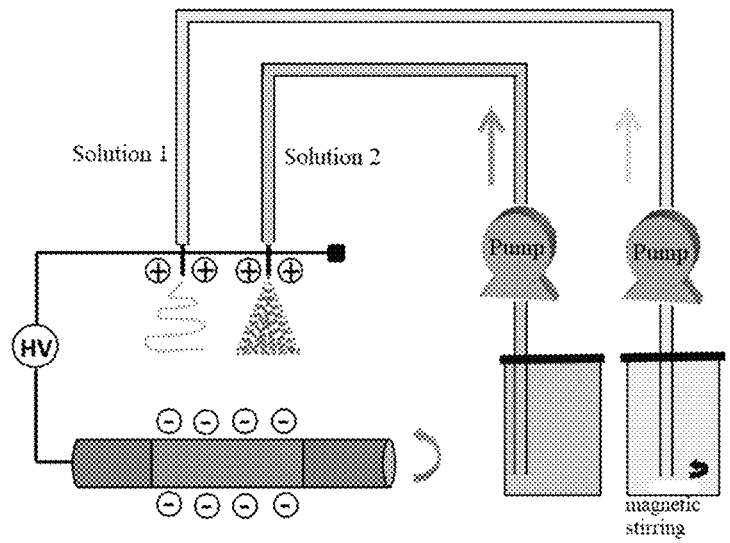
FIG. 4 is a schematic method diagram of preparing a solid-state electrolyte film by electrostatic spinning and electrostatic spraying at the same time in a typical embodiment of the present disclosure.
Figure 5:
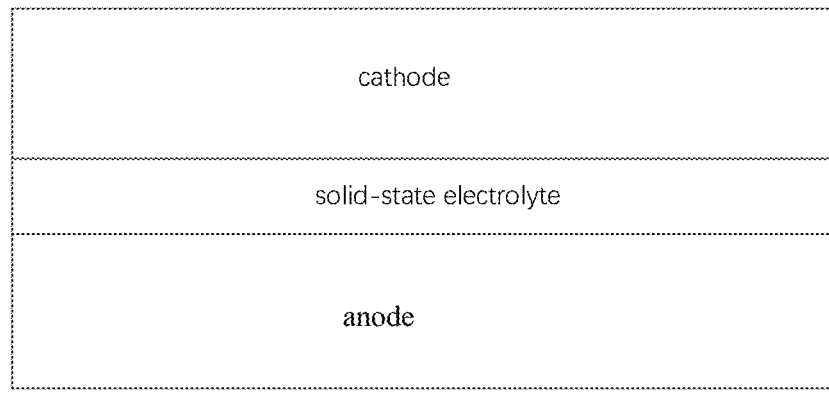
FIG. 5 is a schematic structural diagram of a battery assembled with a solid-state electrolyte in a typical embodiment of the present disclosure.
Figure 6:
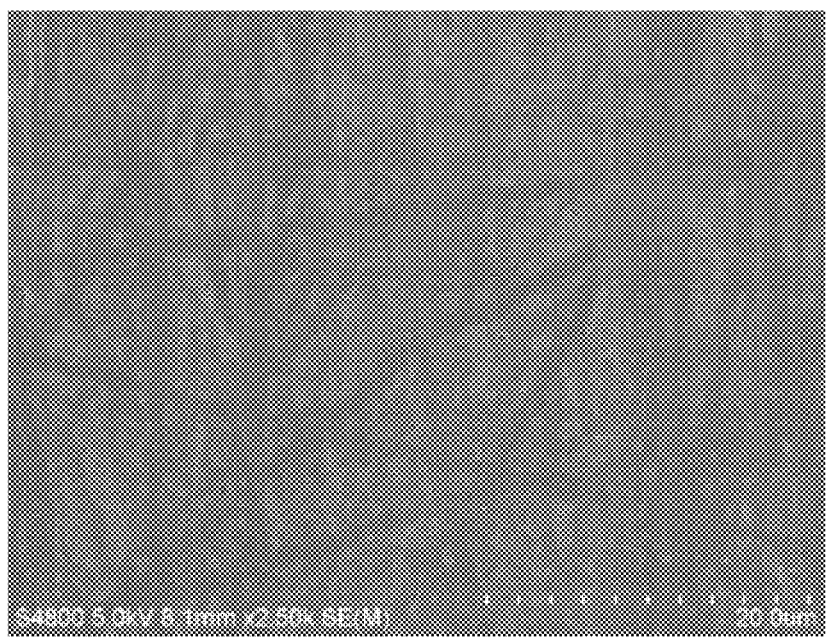
FIG. 6 is an electron microscope diagram of a solid-state electrolyte film prepared by electrostatic spinning and electrostatic spraying at the same time in a typical embodiment of the present disclosure.
Figure 7:
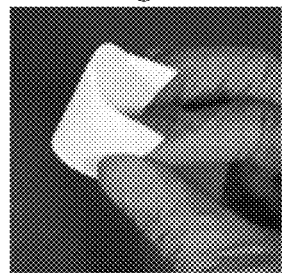
FIG. 7 is a macrophotograph of a solid-state electrolyte film prepared by electrostatic spinning and electrostatic spraying at the same time in a typical embodiment of the present disclosure.

According to the calculation method of the specific interfacial area described above in the present disclosure, the specific interfacial area of the solid-state electrolyte was about 3.5×10$^5$ cm$^2$/cm$^3$. The ionic conductivity of the solid-state electrolyte was tested to be 3.1×10$^{-4}$ S/cm. The electrochemical impedance of the solid-state electrolyte was tested and the results are shown in FIG. 3.

EMBODIMENT 1-3

About 1 g of commercially available polyvinylidene fluoride (PVDF) powder was dissolved in 9 g of N-methylpyrrolidone (NMP) to obtain a polyvinylidene fluoride solution. Then, spinning was carried out at an electrostatic voltage of 15 KV, the distance between the sprayer and the drum receiving device was 15 cm, and the flow rate of the polyvinylidene fluoride solution was 15 μL/min, and after working in this way for about 5 hours, a flexible polymeric thin film was peeled off the drum receiving device, and then was rolled at about 2 MPa for about 10 minutes, then immersed in a 1 mol/L lithium perchlorate/ethanol solution for 5 minutes, and then vacuum dried to remove the solvent to obtain a sheet of solid-state electrolyte with a thickness of 5 μm and a polymer/lithium salt mass ratio of 3:1, and the density thereof was measured to be 1.2 g/cm$^3$.

According to the calculation method of the specific interfacial area described above in the present disclosure, the specific interfacial area of the solid-state electrolyte was about 6×10$^5$ cm$^2$/cm$^3$. The ionic conductivity of the solid-state electrolyte was tested to be 8.1×10$^{-4}$ S/cm.

EMBODIMENT 1-4

About 1 g of commercially available polyacrylonitrile (PAN) powder was dissolved in 7 g of N,N-dimethylformamide (DMF) to obtain a polyacrylonitrile solution. Then, spinning was carried out at an electrostatic voltage of 15 KV, the distance between the sprayer and the drum receiving device was 15 cm, and the flow rate of the polyacrylonitrile solution was 15 μL/min, and after working in this way for about 5 hours, a flexible polymeric thin film was peeled off from the drum receiving device, and then was rolled at about 2 MPa for about 10 minutes, then immersed in different concentrations of lithium hexafluorophosphate/ethanol solution for 5 minutes, and then vacuum dried to remove the solvent to obtain some solid-state electrolytes with a thickness of 20 μm and different contents of lithium salt (the contents of the lithium salt were respectively 10%, 15%, 20% and 25%).

The conductivities of the solid-state electrolytes corresponding to the different lithium salt concentrations were tested and drawn into a curve according to the results, as shown in FIG. 8. As shown in FIG. 8, the ionic conductivity has a maximum value over the lithium salt concentration, it can be seen that the lithium salt concentration is an important factor to adjust the conductivity.

EMBODIMENT 1-5

About 1 g of commercially available polyacrylonitrile (PAN) powder was dissolved in 7 g of N,N-dimethylformamide (DMF) to obtain a polyacrylonitrile solution. Then, spinning was carried out at an electrostatic voltage of 50 KV, the distance between the sprayer and the drum receiving device was 30 cm, and the flow rate of the polyacrylonitrile solution was about 15 μL/min, and after working in this way for about 5 hours, a flexible solid-state electrolyte thin film was peeled off from the drum receiving device, and then was rolled at about 2 MPa for about 10 minutes, then respectively immersed in different concentrations of lithium perchlorate/ethanol solution for 1 minutes, and then vacuum dried to remove the solvent to obtain some solid-state electrolytes with a thickness of 20 μm and different contents of lithium salt (the contents of the lithium salt were respectively 10%, 15%, 20% and 25%). The conductivities of the solid-state electrolytes corresponding to the different lithium salt concentrations were tested to obtain a conductivity distribution curve, which is similar to FIG. 8.

EMBODIMENT 1-6

About 1 g of commercially available polyacrylonitrile (PAN) powder was dissolved in 10 g of N,N-dimethylformamide (DMF) to obtain a polyacrylonitrile solution. About 1 g of inorganic particles (Li$_{6.8}$La$_3$Zr$_{1.8}$Ta$_{0.2}$O$_{12}$, LLZTO powder) with a particle size of about 400 nm was added to about 20 g of ethanol containing about 1 wt. % of a surfactant (polyvinylpyrrolidone) and stirred to disperse, to give a dispersion liquid of the inorganic particles. Spinning and spraying were carried out side by side in parallel at a high voltage of about 20 KV, the distance between the two sprayers and the drum receiving device was about 10 cm, and the flow rate of the polyacrylonitrile solution in the spinning sprayer was about 10 μL/min, the flow rate of the dispersion liquid of the inorganic particles in the spraying sprayer was about 70 μL/min, and after working in this way for about 10 hours, a flexible thin film was peeled off the drum receiving device, and then was rolled at about 1 MPa for about 10 minutes, then immersed in a lithium perchlorate/ethanol solution for 2 minutes, and then vacuum dried to remove the solvent to obtain a flexible solid-state electrolyte film with a thickness of 25 μm, wherein, the content of LLZTO was about 75 wt. %, the content of the lithium salt was 4wt. %, the content of the polymer was 21 wt. %, and the conductivity of the solid-state electrolyte was about $10^{-3}$ S/cm.

According to the calculation method of the specific interfacial area described above in the present disclosure, the specific interfacial area of the solid-state electrolyte was about $8.0 \times 10^5$ cm$^2$/cm$^3$.

Other conditions were kept unchanged, and the content of lithium salt was changed, to obtain solid-state electrolytes of the different lithium salt contents, whose conductivities were tested and drawn into a curve according to the results, as shown in FIG. 9.

Control 1-2 (Blade Coating Film-Forming)

According to the prior art, 1 g of commercially available polyacrylonitrile (PAN) and lithium perchlorate in a mass ratio of 2:1, and about 3 g of inorganic solid ceramic particles Li$_{6.8}$La$_3$Zr$_{1.8}$Ta0.2O$_{12}$ (LLZTO) powder with a particle size of about 400 nm were dispersed into 10 g of DMF, stirred evenly for a long time, and then blade coated to obtain a solid-state electrolyte thin film, the obtained solid-state electrolyte thin film has a low inorganic content (less than about 50 wt. %), and the ionic conductivity was less than $10^{-4}$ S/cm.

Control 1-3 (Side-by-Side Sprayers VS Orthogonal Sprayers)

About 1 g of commercially available polyacrylonitrile (PAN) powder was dissolved in 10 g of N,N-dimethylformamide (DMF) to obtain a polyacrylonitrile solution. About 1 g of inorganic solid ceramic particles Li$_{6.8}$La$_3$Zr$_{1.8}$Ta$_{0.2}$O$_{12}$ (LLZTO) powder with a particle size of about 400 nm was added to about 20 g of ethanol containing about 1 wt. % of a surfactant and stirred to disperse, to give a LLZTO dispersion liquid. Spinning and spraying were carried out by two sprayers in an orthogonal manner at a high voltage of 25 KV at the same time, the distance between the two sprayers and the drum receiving device was 10 cm, and the flow rate of the polyacrylonitrile solution in the spinning sprayer was about 10 μL/min, the flow rate of the dispersion liquid of the lithium ion electrolyte in the spraying sprayer was about 100 μL/min, and after working in this way for about 10 hours, a flexible lithium ion electrolyte thin film was peeled off the drum receiving device, wherein, the content of LLZTO was about 60 wt. %, with a poor evenness.

Wherein, the sprayers side-by-side means that the plane formed by the electrostatic spinning sprayer running along the axial direction of the drum coincides with the plane formed by the electrostatic spraying sprayer running along the axial direction of the drum; the sprayers perpendicular to each other means the plane formed by the electrostatic spinning sprayer running along the axial direction of the drum is perpendicular to the plane formed by the electrostatic spraying sprayer running along the axial direction of the drum.

Control 1-4 (Joint Spinning after Mixing the Organic Phase and the Inorganic Phase)

About 0.5 g of commercially available polyacrylonitrile (PAN) powder and about 0.25 g of lithium perchlorate were dissolved in 10 g of N,N-dimethylformamide (DMF) to obtain a polyacrylonitrile polymeric solution. Then about 1.25 g of inorganic solid ceramic particles Li$_{6.8}$La$_3$Zr$_{1.8}$Ta$_{0.2}$O$_{12}$ (LLZTO) powder with a particle size of about 400 nm was added to the above polyacrylonitrile polymeric solution and stirred to disperse, to give a mixed liquid. Spinning was carried out at a high voltage of about 20 KV, the distance between the sprayer and the drum receiving device was about 10 cm, and the flow rate of the mixed solution in the spinning sprayer was about 10 μL/min, and after working in this way for about 20 hours, a thin film was peeled off the drum receiving device, and then was rolled at about 2 MPa for about 10 minutes, and although the content of LLZTO was up to about 60 wt. %, the specific interfacial area of the solid-state electrolyte was about $7 \times 10^5$ cm$^2$/cm$^3$ according to the calculation method of the specific interfacial area described above in the present disclosure. However, the compactness and conductivity of the obtained solid-state electrolyte film are poor (less than $10^{-4}$ S/cm), which is because the inorganic particles in the solid-state electrolyte film prepared by this method block the interface of the organic phase to a certain extent, resulting in that there is no three-dimensionally interconnected interface formed in the organic phase or the area of the three-dimensionally interconnected interface reduces significantly.

EMBODIMENT 1-7

Non-Ionic Conductor Inorganic Particle-Zinc Oxide

About 1 g of commercially available polyacrylonitrile (PAN) powder was dissolved in 10 g of N,N-dimethylformamide (DMF) to obtain a polyacrylonitrile solution. About 1 g of zinc oxide powder with a particle size of about 20 nm was added to about 20 g of ethanol containing about 1 wt. % of a surfactant and stirred to disperse, to give a dispersion liquid of the inorganic particles. Spinning and spraying were carried out side by side in parallel at a high voltage of about 20 KV, the distance between the two sprayers and the drum receiving device was about 10 cm, and the flow rate of the polyacrylonitrile solution in the spinning sprayer was about 10 μL/min, the flow rate of the dispersion liquid of the inorganic particles in the spraying sprayer was about 1000 μL/min, and after working in this way for about 10 hours, a flexible ceramic thin film was peeled off the drum receiving device, and then was rolled at about 2 MPa for about 10 minutes, then immersed in a 1 mol/L lithium perchlorate/ethanol solution for 10 minutes, and then vacuum dried to remove the solvent to obtain a flexible solid-state electrolyte film with a thickness of 30 μm, wherein the content of zinc oxide was about 70 wt. %. In addition, solid-state electrolyte films containing different lithium salt contents was prepared and tested for the conductivity, as shown in FIG. 10, and the highest conductivity was $1.0 \times 10^{-3}$ S/cm.

EMBODIMENT 1-8

Non-Ionic Conductor Inorganic Particle-Zirconia

About 1 g of commercially available polyacrylonitrile (PAN) powder was dissolved in 10 g of N,N-dimethylformamide (DMF) to obtain a polyacrylonitrile solution. About 1 g of zirconia powder with a particle size of about 100 nm was added to about 20 g of ethanol containing about 1 wt. % of a surfactant and stirred to disperse, to give a dispersion liquid of the inorganic particles. Spinning and spraying were carried out side by side in parallel at a high voltage of about 20 KV, the distance between the two sprayers and the drum receiving device was about 5 cm, and the flow rate of the polyacrylonitrile solution in the spinning sprayer was about 10 μL/min, the flow rate of the dispersion liquid of the inorganic particles in the spraying sprayer was about 50 μL/min, and after working in this way for about 10 hours, a flexible ceramic thin film was peeled off the drum receiving device, and then was rolled at about 20 MPa for about 10 minutes, then immersed in a 1 mol/L lithium perchlorate/ethanol solution for 2 minutes, and then vacuum dried to remove the solvent to obtain a flexible solid-state electrolyte film with a thickness of 30 μm, wherein the content of zirconia was about 50 wt. %. In addition, solid-state electrolyte films containing different lithium salt contents was prepared and tested for the conductivity, and it is found that the conductivity magnitude and the change rule with the lithium salt content are similar to those shown in FIG. 10.

EMBODIMENT 1-9

Non-Ionic Conductor Inorganic Particle-Cadmium Sulfide

About 1 g of commercially available polyacrylonitrile (PAN) powder was dissolved in 10 g of N,N-dimethylformamide (DMF) to obtain a polyacrylonitrile solution. About 1 g of cadmium sulfide powder with a particle size of about 100 nm was added to about 20 g of ethanol containing about 1 wt. % of a surfactant and stirred to disperse, to give a dispersion liquid of the inorganic particles. Spinning and spraying were carried out side by side in parallel at a high voltage of about 20 KV, the distance between the two sprayers and the drum receiving device was about 5 cm, and the flow rate of the polyacrylonitrile solution in the spinning sprayer was about 10 μL/min, the flow rate of the dispersion liquid of the inorganic particles in the spraying sprayer was about 30 μL/min, and after working in this way for about 8 hours, a flexible ceramic thin film was peeled off the drum receiving device, and then was rolled at about 2 MPa for about 10 minutes, then immersed in a 1 mol/L lithium perchlorate/ethanol solution for 2 minutes, and then vacuum dried to remove the solvent to obtain a flexible solid-state electrolyte film with a thickness of 30 μm and a polymer/lithium salt mass ratio of 6:1, wherein the content of cadmium sulfide was about 50 wt. %.

EMBODIMENT 1-10

Non-Ionic Conductor Inorganic Particle-Boron Nitride

About 1 g of commercially available polyacrylonitrile (PAN) powder was dissolved in 10 g of N,N-dimethylformamide (DMF) to obtain a polyacrylonitrile solution. About 1 g of boron nitride powder with a particle size of about 100 nm was added to about 20 g of ethanol containing about 1 wt. % of a surfactant and stirred to disperse, to give a dispersion liquid of the inorganic particles. Spinning and spraying were carried out side by side in parallel at a high voltage of about 20 KV, the distance between the two sprayers and the drum receiving device was about 5 cm, and the flow rate of the polyacrylonitrile solution in the spinning sprayer was about 10 μL/min, the flow rate of the dispersion liquid of the inorganic particles in the spraying sprayer was about 500 μL/min, and after working in this way for about 6 hours, a flexible ceramic thin film was peeled off the drum receiving device, and then was rolled at about 100 KPa for about 60 minutes, then immersed in a 1 mol/L lithium perchlorate/ethanol solution for 4 minutes, and then vacuum dried to remove the solvent to obtain a flexible solid-state electrolyte film with a thickness of 20 μm and a polymer/lithium salt mass ratio of 5:1, wherein the content of boron nitride was about 70 wt. %.

EMBODIMENT 1-11

About 1 g of commercially available polyvinylpyrrolidone (PVP) powder was dissolved in 10 g of ethanol to obtain a polyvinylpyrrolidone solution. About 1 g of commercially available inorganic particles (LiPON-type solid-state electrolyte powder) with a particle size of about 300 nm was added to about 20 g of acetone containing about 1 wt. % of a surfactant and stirred to disperse, to give a dispersion liquid of the inorganic particles. Spinning and spraying were carried out side by side in parallel at a high voltage of about 30 KV, the distance between the two sprayers and the drum receiving device was about 5 cm, and the flow rate of the polyvinylpyrrolidone solution in the spinning sprayer was about 10 μL/min, the flow rate of the dispersion liquid of the inorganic particles in the spraying sprayer was about 100 μL/min, and after working in this way for about 3 hours, a flexible lithium ion electrolyte thin film was peeled off the drum receiving device, and then was rolled at about 20 MPa for about 1 minutes, then immersed in a 1 mol/L lithium perchlorate/ethanol solution for 2 minutes, and then vacuum dried to remove the solvent to obtain a flexible solid-state electrolyte film with a thickness of 10 μm and a polymer/lithium salt mass ratio of 6:1, wherein the content of LiPON was about 75 wt. %, and the conductivity tested was $1.0 \times 10^{-4}$ S/cm, and the density was 3.1 g/cm$^3$.

EMBODIMENT 1-12

About 1 g of commercially available polymethyl methacrylate (PMMA) powder was dissolved in 10 g of N,N-dimethylformamide (DMF) to obtain a polymethyl methacrylate solution. About 1 g of magnesium oxide powder with a particle size of about 200 nm was added to about 20 g of water containing about 1 wt. % of a surfactant and stirred to disperse, to give a dispersion liquid of magnesium oxide. Spinning and spraying were carried out side by side in parallel at a high voltage of about 5 KV, the distance between the two sprayers and the drum receiving device was about 30 cm, and the flow rate of the polymethyl methacrylate solution in the spinning sprayer was about 200 μL/min, the flow rate of the dispersion liquid of magnesium oxide in the spraying sprayer was about 2 μL/min, and after working in this way for about 10 hours, a flexible magnesium ion electrolyte thin film was peeled off the drum receiving device, and then was rolled at about 2 MPa for about 10 minutes, then immersed in a magnesium salt solution for 24 h, and then vacuum dried to remove the solvent to obtain a flexible solid-state electrolyte film with a thickness of 50 μm and a polymer/magnesium salt mass ratio of 10:1, wherein the content of magnesium ion conductor was about 76 wt. %, the conductivity was $1.1 \times 10^{-3}$ S/cm, and the density was 3.0 g/cm$^3$.

EMBODIMENT 1-13

About 1 g of commercially available polytetrafluoroethylene powder was dissolved in 10 g of dimethylacetamide to obtain a polytetrafluoroethylene solution. About 1 g of inorganic particles (aluminium oxide powder) with a particle size of about 10 μm was added to about 20 g of ethanol containing about 1 wt. % of a surfactant and stirred to disperse, to give a dispersion liquid of the inorganic particles. Spinning and spraying were carried out side by side in parallel at a high voltage of about 50 KV, the distance between the two sprayers and the drum receiving device was about 25 cm, and the flow rate of the polytetrafluoroethylene solution in the spinning sprayer was about 7 μL/min, the flow rate of the dispersion liquid of the inorganic particles in the spraying sprayer was about 100 μL/min, and after working in this way for about 10 hours, a flexible thin film was peeled off the drum receiving device, and then was rolled at about 2 MPa for about 10 minutes, then immersed in an aluminium salt solution for 2 minutes, to obtain a flexible solid-state electrolyte film, wherein the content of aluminium oxide was about 90 wt. %.

It can be known from the above Embodiments 1-1, 1-2 and 1-3 and Control 1-1 that the electrolyte preparation method of the present disclosure is suitable for preparing a variety of different solid-state electrolytes, and can obtain a higher conductivity than the traditional blade coating method. It can be known from Embodiments 1-4 and 1-5 that the lithium ion solid-state electrolyte prepared by the electrolyte preparation process of the present disclosure can obtain the maximum value of conductivity by adjusting the concentration of the lithium salt, and this rule is applicable to different types of lithium salts. It can be known from the above Embodiments 1-6 and Controls 1-2, 1-3 and 1-4 that the electrolyte preparation process of the present disclosure can be achieved by compositing two organic and inorganic solid-state electrolytes, and the conductivity of the solid-state electrolyte obtained is higher than that of the traditional blade coating method, and the conductivity of the organic-inorganic composite electrolyte prepared by compositing inorganic substances into organic fibers. It can be known from above Embodiments 1-7, 1-8, 1-9 and 1-10 that by using non-conducting inorganic ceramics as the inorganic phase of the composite electrolyte, the conductivity of the obtained organic-inorganic composite electrolyte film is similar to that of the composite electrolyte film of ion-containing type inorganic ceramics. It can be known from the above embodiments 1-11 that the electrolyte preparation method of the present disclosure is suitable for preparing composite solid-state electrolytes that composites other organic materials and inorganic ceramics. It can be known from the above Embodiments 1-12 and 1-13 that the electrolyte preparation method of the present disclosure is suitable for preparing a variety of different electrolytes, such as magnesium ion solid-state electrolytes and aluminium ion solid-state electrolytes.

The flexible solid-state electrolyte films provided by Embodiments 1-5 and 1-6 have high ionic conductivity (meeting the application requirements of electrochemical devices), and meanwhile have special mechanical properties and can still maintain mechanical integrity even when they are processed into a very thin film, do not break when bent, and have good processability, and exhibit good electrochemical performance in secondary battery applications.

The performance of the PAN:LLZTO-CSE flexible solid-state electrolyte obtained in Embodiment 1-6 of the present disclosure was compared with the electrolytes obtained in the following existing documents 1 to 7, and the results are shown in Table 1-1. Since the solid-state electrolyte obtained by the present disclosure has high conductivity and the electrolyte can be very thin, for example, in the case of 5 microns, the area specific conductance of the solid-state electrolyte is 2400 mS·cm$^{-2}$, which is at the highest level among the solid-state electrolytes currently reported.

Document 1, Kamaya, N. et al. A lithium superionic conductor. *Nature materials* 10, 682-686, doi: 10.1038/nmat3066 (2011). The performance parameters of the prepared sulfide $Li_{10}GeP_2S_{12}$, such as ionic conductivity, thickness, area specific conductance, flexibility, etc., are shown in Table 1.

Document 2, Kato, Y. et al. High-power all-solid-state batteries using sulfide superionic conductors. *Nature Energy* 1, 16030, doi: 10.1038/nenergy.2016.30 (2016). The performance parameters of the prepared sulfide $Li_{9.54}Si_{1.74}P_{1.44}S_{11.7}C_{10.3}$, such as ionic conductivity, thickness, area specific conductance, flexibility, etc., are shown in Table 1.

Document 3, Liu, Z. et al. Anomalous High Ionic Conductivity of Nanoporous $\beta$-$Li_3PS_4$, *Journal of the American Chemical Society* 135, 975-978, doi: 10.1021/ja3110895 (2013). The performance parameters of the prepared sulfide $\beta$-$Li_3PS_4$, such as ionic conductivity, thickness, area specific conductance, flexibility, etc., are shown in Table 1.

Document 4, Murugan, R., Thangadurai, V. & Weppner, W. Fast Lithium Ion Conduction in Garnet-Type $Li_7La_3Zr_2O_{12}$. *Angewandte Chemie International Edition* 46, 7778-7781, doi: 10.1002/anie.200701144 (2007). The performance parameters of the prepared oxide $Li_7La_3Zr_2O_{12}$, such as ionic conductivity, thickness, area specific conductance, flexibility, etc., are shown in Table 1.

Document 5, Fu, K. K. et al Flexible, solid-state, ion-conducting membrane with 3D garnet nanofiber networks for lithium batteries. *Proc Natl Acad Sci USA* 113, 7094-7099, doi: 10.1073/pnas.1600422113 (2016). The performance parameters of the prepared composite electrolyte FRPC, such as ionic conductivity, thickness, area specific conductance, flexibility, etc., are shown in Table 1.

Document 6, Zhao, C. Z. et al. An anion-immobilized composite electrolyte for dendrite-free lithium metal anodes, *Proc Natl Acad Sci USA*, doi: 10.1073/pnas.1708489114 (2017). The performance parameters of the prepared composite electrolyte PLL, such as ionic conductivity, thickness, area specific conductance, flexibility, etc., are shown in Table 1.

Document 7, Zhang, X. et al. Synergistic Coupling between $Li_{6.75}La_3Zr_{1.75}Ta_{0.25}O_{12}$ and Poly(vinylidene fluoride) Induces High Ionic Conductivity, Mechanical Strength, and Thermal Stability of Solid Composite Electrolytes. *Journal of the American Chemical Society*, doi: 10.1021/jacs.7b06364 (2017). The performance parameters of the prepared composite electrolyte PVDF/LLZTO-CPE, such as ionic conductivity, thickness, area specific conductance, flexibility, etc., are shown in Table 1.

Table 1-1 performance parameters of the obtained solid-state electrolyte in existing documents 1-7 and Embodiment 1-6

| SEs | SEs | | Ionic conductivity (mS · cm²/cm³) | Thickness (μm) | Area specific conductance (mS · cm⁻²) | Flexible or not |
|---|---|---|---|---|---|---|
| Document 1 | Sulfide | $Li_{10}GeP_2S_{12}$ | 12 | 3000-4000 | 30-40 | Not |
| Document 2 | | $Li_{9.54}Si_{1.74}P_{1.44}S_{11.7}C_{10.3}$ | 25 | 240 | 1041 | Not |
| Document 3 | | $\beta\text{-}Li_3PS_4$ | 0.16 | 1000 | 1.6 | Not |
| Document 4 | Oxide | $Li_7La_3Zr_2O_{12}$ | 0.24 | 980-1020 | 2.35-2.44 | Not |
| Document 5 | Composite | FRPC | 0.25 | 40-50 | 50-62.5 | Yes |
| Document 6 | electrolyte | PLL | 0.11 | 30 | 36.6 | Yes |
| Document 7 | | PVDF/LLZTO-CPE | 0.50 | 100 | 50 | Yes |
| Embodiment 6 | | PAN:LLZTO-CSE | 1.1 | 5 | 2400 | Yes |

In addition, referring to Embodiments 1-1 to 1-13, the inventors of the present disclosure also conducted tests with other raw materials and conditions listed in this specification, and similarly obtained flexible solid-state electrolyte with high ionic conductivity (greater than $10^{-4}$ S/cm), and excellent mechanical properties and electrochemical properties.

EMBODIMENT 1-14

About 1 g of commercially available polyacrylonitrile (PAN) powder was dissolved in 7 g of N,N-dimethylformamide (DMF) to obtain a polyacrylonitrile solution. Then, spinning was carried out at an electrostatic voltage of 15 KV, the distance between the sprayer and the drum receiving device was about 15 cm, and the flow rate of the polyacrylonitrile solution was 15 μL/min, and after working in this way for about 5 hours, a flexible polymeric thin film was peeled off the drum receiving device, wherein the diameter of the polyacrylonitrile fibers was about 400 nm, and then the flexible polymeric thin film was rolled at about 2 MPa for about 10 minutes, then immersed in a 1 mol/L lithium perchlorate/ethanol solution, and then vacuum dried to remove the solvent to obtain a sheet of solid-state electrolyte with a thickness of 20 μm and a polymer/lithium salt mass ratio of 5:1, and the ionic conductivity of the solid-state electrolyte was $5 \times 10^{-4}$ S/cm.

EMBODIMENT 1-15

Figure 26:
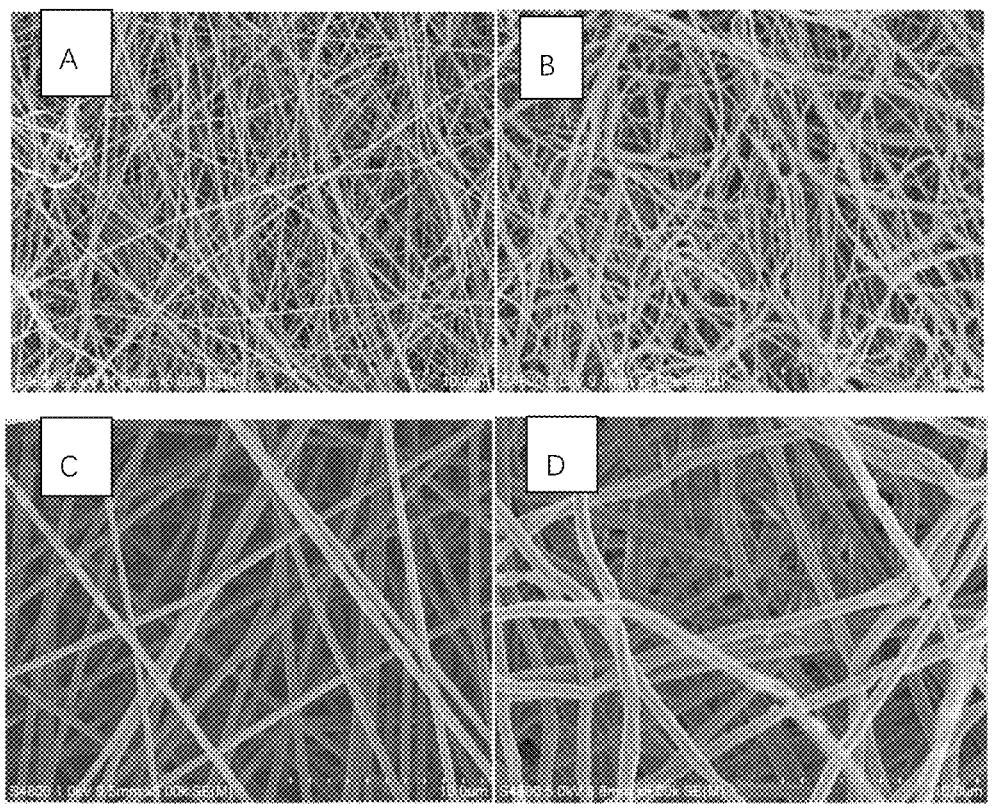
FIG. 26 is an SEM image of fiber films formed by aggregation of polymeric fibers of different diameters, where A is a fiber film formed by aggregation of polymeric fibers with a diameter of about 200 nm; B is a fiber film formed by aggregation of polymeric fibers with a diameter of about 300 nm; C is a fiber film formed by aggregation of polymeric fibers with a diameter of about 400 nm; and D is a fiber film formed by aggregation of polymeric fibers with a diameter of about 500 nm.

Based on the method of Embodiment 1-14, spinning sprayers with different bore diameters were used to change the diameters of polyacrylonitrile fibers (SEM photos of fiber films made of polyacrylonitrile fibers of different diameters are shown in FIG. 26), and to obtain solid-state electrolytes with membrane materials having different specific interfacial areas (other conditions were exactly the same as in Embodiment 14), and the ionic conductivity of the solid-state electrolytes was tested. The results are shown in Table 1-2.

TABLE 1-2

Performance parameters of the solid-state electrolytes with different specific interfacial areas

| Spinning fiber diameter | Specific interfacial area of the organic phase | Ionic conductivity (mS · cm²/cm³) |
|---|---|---|
| 100 nm | 4.0 | 0.88 |
| 150 nm | 2.7 | 0.83 |
| 200 nm | 2.0 | 0.79 |
| 250 nm | 1.6 | 0.77 |
| 300 nm | 1.3 | 0.69 |
| 400 nm | 1.0 | 0.55 |
| 500 nm | 0.8 | 0.45 |

It can be seen from Table 1-2 that when other conditions remain unchanged, the ionic conductivity of the solid-state electrolyte increases as the specific interfacial area of the organic phase increases.

EMBODIMENT 1-16

About 1 g of commercially available polyacrylonitrile (PAN) powder was dissolved in 10 g of N,N-dimethylformamide (DMF) to obtain a polyacrylonitrile solution. About 1 g of inorganic particles (zinc oxide powder) with a particle size of about 20 nm was added to about 20 g of ethanol containing about 1 wt. % of a surfactant and stirred to disperse, to give a dispersion liquid of the inorganic particles. Spinning and spraying were carried out side by side in parallel at a high voltage of about 15 KV, the distance between the two sprayers and the drum receiving device was about 10 cm, and the flow rate of the polyacrylonitrile solution in the spinning sprayer was about 10 μL/min, spinning fiber diameter is 400 nm, the flow rate of the dispersion liquid of the inorganic particles in the spraying sprayer was about 1000 μL/min, and after working in this way for about 10 hours, a flexible ceramic thin film was peeled off the drum receiving device, and then was rolled at about 2 MPa for about 10 minutes, then immersed in a 1 mol/L lithium perchlorate/ethanol solution, and then vacuum dried to remove the solvent to obtain a flexible solid-state electrolyte film with a thickness of 30 μm, a polymer/lithium salt mass ratio of 5:1 and the content of zinc oxide up to about 70 wt. %.

Based on the above basically the same method, only the content of inorganic particles was changed to prepare flexible solid-state electrolyte films with different content of inorganic particles, and the specific interfacial area was calculated and the ionic conductivity of the solid-state electrolytes was tested, and the results are shown in Table 1-3.

TABLE 1-3

Performance parameters of the solid-state electrolytes with different content of inorganic particles

| Content of inorganic particles | Specific interfacial area of the organic phase | Ionic conductivity (mS · cm$^2$/cm$^3$) |
|---|---|---|
| 70 wt. % | 3.4 | 1.0 |
| 60 wt. % | 2.9 | 0.8 |
| 50 wt. % | 2.4 | 0.6 |
| 40 wt. % | 2.0 | 0.5 |
| 30 wt. % | 1.5 | 0.4 |
| 20 wt. % | 0.95 | 0.3 |
| 10 wt. % | 0.53 | 0.2 |

It can be seen from Table 1-3 that by adding different amounts of inorganic particles, membrane materials with different specific interfacial areas can be obtained, and the ionic conductivity of the solid-state electrolyte prepared from this method increases as the specific interfacial area of the organic phase increases.

Moreover, the preparation method of the solid-state electrolyte provided by the present disclosure is applicable to both the lithium ion battery systems and the ion battery systems such as Mg/Al ion battery systems, which provides a good idea for the research and development of the all-solid-state batteries. At the same time, the method provided by the present disclosure is not only applicable to the preparation of solid-state electrolyte films, but also applicable to the preparation of all inorganic material films, and has universal significance.

EMBODIMENT 2-1

Figure 13:
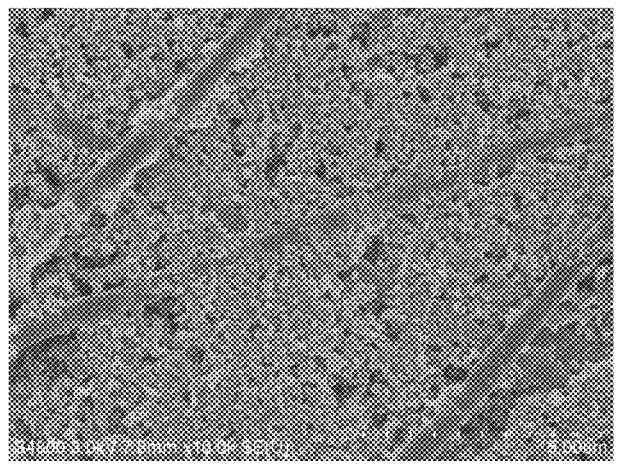
FIG. 13 is a scanning electron microscope diagram of the obtained flexible solid-state cathode composite material after dropwise adding a lithium salt in Embodiment 2-1 of the present disclosure.
Figure 14:
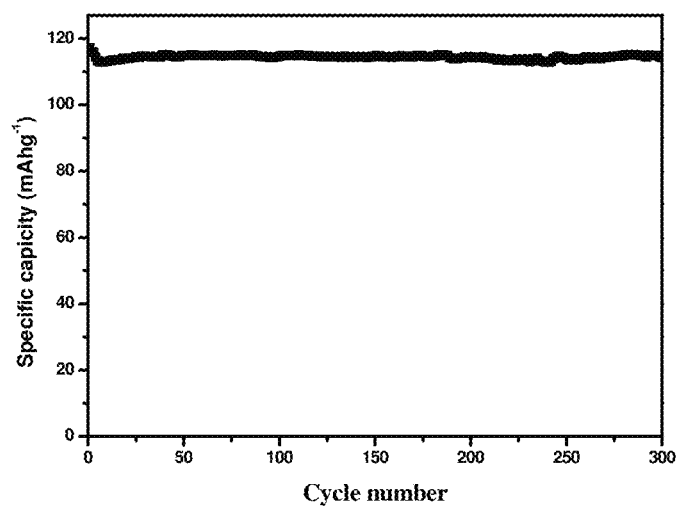
FIG. 14 is a graph of the electrochemical cycle performance of the flexible solid-state cathode composite material prepared in Embodiment 2-1 of the present disclosure.

About 1 g of commercially available polyvinylidene fluoride (PVDF) powder was dissolved in 10 g of N,N-dimethylformamide (DMF) to obtain a polyvinylidene fluoride solution. About 1 g of commercially available lithium iron phosphate powder with a particle size of about 700 nm and 0.14 g of commercially available acetylene black were added to about 20 g of ethanol containing about 1 wt. % of a surfactant and stirred to disperse, to give a mixed dispersion liquid of the cathode active material and acetylene black. Spinning and spraying were carried out side by side in parallel at a high voltage of about 20 KV, the distance between the spinning sprayer and spraying sprayer and the drum receiving device was about 8 cm, and the flow rate of the polyvinylidene fluoride solution in the spinning sprayer was about 10 µL/min, the flow rate of the mixed dispersion liquid in the spraying sprayer was about 80 µL/min, and after working in this way for about 8 hours, a flexible cathode thin film was peeled off the drum receiving device, and then was rolled at about 100 KPa for about 60 minutes to obtain a flexible solid-state cathode film with a thickness of 80 µm and a density of 2.5 g/cm$^3$, wherein the content of the cathode active material was about 70 wt. %. The scanning electron microscope diagram of the flexible solid-state cathode film prepared in this embodiment is shown in FIG. 11, and its macrophotograph is shown in FIG. 12. In addition, succinonitrile-5wt. % lithium bis(trifluoromethanesulfonyl)imide (SN-5wt. % LITFSI) was heated to melt and then dropped a drop into the flexible cathode film, so that the mass ratio of the electrolyte salt to the organic fiber material in the solid-state cathode composite material was 1:6, that is, the solid-state cathode composite material, the scanning electron microscope diagram is shown in FIG. 13, and its application to the all-solid-state lithium battery shows good electrochemical performance, and its cycle performance is as shown in FIG. 14.

EMBODIMENT 2-2

Figure 15:
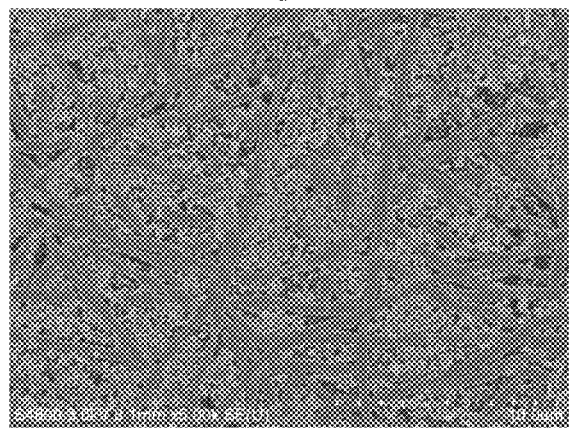
FIG. 15 is a scanning electron microscope diagram of a flexible solid-state cathode composite material prepared in Embodiment 2-2 of the present disclosure.
Figure 16:
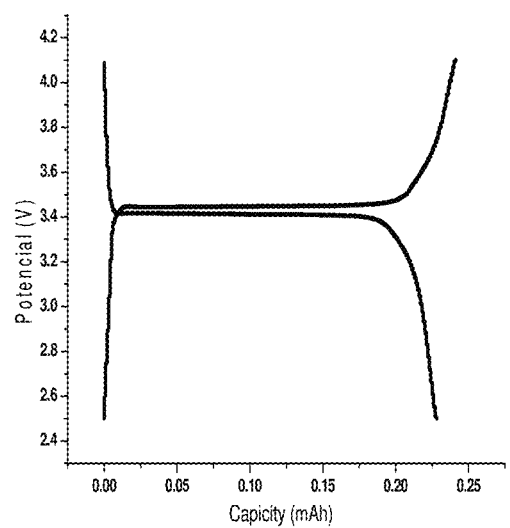
FIG. 16 is a first charging and discharging curve graph when the flexible solid-state cathode composite material prepared in Embodiment 2-2 of the present disclosure is used as a cathode.

About 1 g of commercially available polytetrafluoroethylene (PTFE) powder was dissolved in 10 g of N-methylpyrrolidone to obtain a polytetrafluoroethylene solution. About 0.8 g of commercially available lithium iron phosphate powder with a particle size of about 700 nm, 0.14 g of commercially available Ketjen black with a particle size of about 30 to 45 nm, and 0.2 g of lithium ion fast conductor lithium lanthanum zirconium tantalum oxide (LLZTO) with a particle size of about 300 to 450 nm were added to about 20 g of ethanol containing about 1 wt. % of a surfactant and stirred to disperse, to give a mixed dispersion liquid. Spinning and spraying were carried out side by side in parallel at a high voltage of about 15 KV, the distance between the spinning sprayer and spraying sprayer and the drum receiving device was about 5 cm, and the flow rate of the polytetrafluoroethylene solution in the spinning sprayer was about 10 µL/min, the flow rate of the mixed dispersion liquid in the spraying sprayer was about 100 µL/min, and after working in this way for about 8 hours, a flexible solid-state cathode thin film was peeled off the drum receiving device, and then was rolled at about 1 MPa for about 1 minutes to obtain a thickness of 100 µm, then immersed in a lithium perchlorate/ethanol solution for 20 minutes to obtain a mass ratio of the electrolyte salt to the organic fiber material of 1:3, to give a flexible solid-state cathode composite material with an ionic conductivity of $1.0 \times 10^{-3}$ S/cm and a density of 2.8 g/cm$^3$, wherein the content of the lithium iron phosphate cathode active material was about 80 wt. %. The scanning electron microscope diagram of the flexible solid-state cathode composite material prepared in this embodiment is shown in FIG. 15, and its first charging and discharging curve graph is shown in FIG. 16.

EMBODIMENT 2-3

Figure 17:
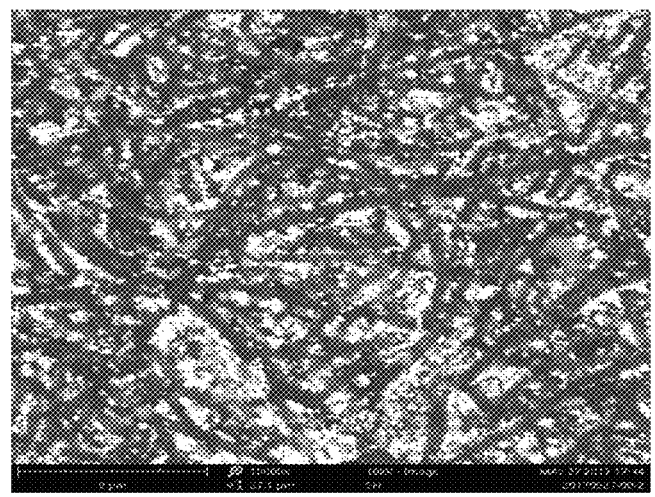
FIG. 17 is a scanning electron microscope diagram of a flexible solid-state cathode composite material prepared in Embodiment 2-3 of the present disclosure.
Figure 18:
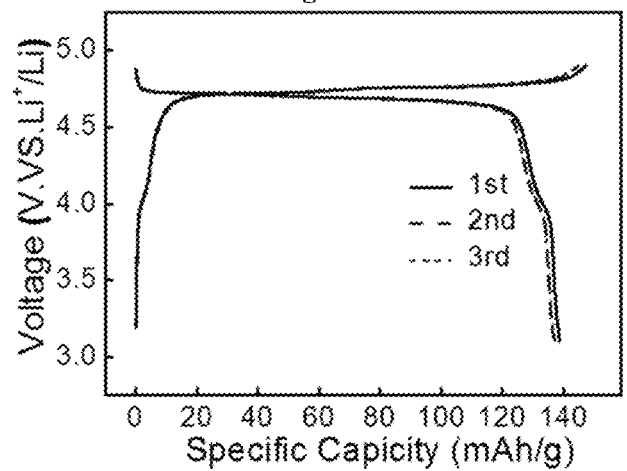
FIG. 18 is a charging and discharging curve of the flexible solid-state cathode composite material prepared in Embodiment 2-3 of the present disclosure.

About 1 g of commercially available polyacrylonitrile (PAN) powder was dissolved in 10 g of N,N-dimethylformamide (DMF) to obtain a polyacrylonitrile solution. About 1 g of commercially available lithium nickel-manganate (LiNi$_{0.5}$Mn$_{0.5}$O$_2$) powder and 0.14 g of commercially available Ketjen black were added to about 20 g of ethanol containing about 1 wt. % of a surfactant and stirred to disperse, to give a mixed dispersion liquid. Spinning and spraying were carried out side by side in parallel at a high voltage of about 15 KV, the distance between the spinning sprayer and spraying sprayer and the drum receiving device was about 15 cm, and the flow rate of the polyacrylonitrile solution in the spinning sprayer was about 10 µL/min, the flow rate of the mixed dispersion liquid in the spraying sprayer was about 70 µL/min, and after working in this way for about 16 hours, a flexible solid-state cathode thin film was peeled off the drum receiving device, and then was rolled at about 1 MPa for about 1 minutes to obtain a thickness of 250 µm, then immersed in a lithium perchlorate/ethanol solution for a period of time and then dried to obtain a mass ratio of the electrolyte salt to the organic fiber material of 1:5, to give a flexible solid-state cathode composite material with an ionic conductivity of $1.0 \times 10^{-4}$ S/cm and a the density of 3.8 g/cm$^3$, wherein the content of lithium nickel-manganate was about 85 wt. %. The scanning electron microscope diagram of the flexible solid-state cathode composite material prepared in this embodiment is shown in FIG. 17, and its first charging and discharging curve graph is shown in FIG. 18.

EMBODIMENT 2-4

Figure 19:
FIG. 19 is a scanning electron microscope diagram of a flexible solid-state cathode composite material prepared in Embodiment 2-4 of the present disclosure.

About 0.4 g of commercially available polyvinylidene fluoride (PVDF) powder was dissolved in 10 g of N-methylpyrrolidone to obtain a polyvinylidene fluoride solution. About 1 g of commercially available lithium nickel-cobalt-manganate Li(NiCoMn)O$_2$ powder with a particle size of about 5 μm and 0.15 g of commercially available acetylene black with a particle size of about 30 to 45 nm were added to about 20 g of acetone containing about 0.1 wt. % of a surfactant and stirred to disperse, to give a mixed dispersion liquid. Spinning and spraying were carried out side by side in parallel at a high voltage of about 50 KV, the distance between the spinning sprayer and spraying sprayer and the drum receiving device was about 20 cm, and the flow rate of the polyvinylidene fluoride solution in the spinning sprayer was about 200 μL/min, the flow rate of the mixed dispersion liquid in the spraying sprayer was about 2 μL/min, and after working in this way for about 15 hours, a flexible solid-state cathode thin film was peeled off the drum receiving device, and then was rolled at about 10 MPa for about 5 minutes to obtain a flexible solid-state cathode film with a thickness of 200 μm, wherein the content of the inorganic cathode active material particles lithium nickel-cobalt-manganate was about 95 wt. %. In addition, 1 mol/L of lithium bis(trifluoromethanesulfonyl)imide-ethanol solution was added dropwise to the flexible cathode thin film, so that the mass ratio of the electrolyte salt to the organic fiber material was 1:4, that is, the solid-state cathode composite material, the ionic conductivity thereof was 1.0×10$^{-4}$ S/cm, the density was 4.3 g/cm$^3$, and the scanning electron microscope diagram thereof is shown in FIG. 19.

EMBODIMENT 2-5

About 1 g of commercially available polyacrylonitrile (PAN) powder was dissolved in 10 g of dimethyl sulfoxide to obtain a polyacrylonitrile solution. About 2 g of commercially available lithium manganate powder with a particle size of about 700 nm was added to about 20 g of isopropanol and stirred to disperse, to give a dispersion liquid of lithium manganate. Spinning and spraying were carried out side by side in parallel at a high voltage of about 5 KV, the distance between the spinning sprayer and spraying sprayer and the drum receiving device was about 5 cm, and the flow rate of the polyacrylonitrile solution in the spinning sprayer was about 10 μL/min, the flow rate of the dispersion liquid of lithium manganate in the spraying sprayer was about 500 μL/min, and after working in this way for about 30 hours, a flexible solid-state cathode thin film was peeled off the drum receiving device, and then was rolled at about 20 MPa for about 1 minutes to obtain a thickness of 300 μm, then immersed in a lithium salt solution for a period of time and then dried to obtain a mass ratio of the electrolyte salt to the organic fiber material of 1:3, to give a flexible solid-state cathode composite material with a density of 2.5 g/cm$^3$, wherein the content of lithium manganate was about 60 wt. %.

EMBODIMENT 2-6

About 1 g of commercially available polymethyl methacrylate (PMMA) was dissolved in 10 g of acetonitrile to obtain a polymethyl methacrylate solution. About 1 g of commercially available lithium cobalt oxide powder with a particle size of about 700 μm and 0.14 g of commercially available acetylene black with a particle size of about 30 to 45 nm were added to about 20 g of water and stirred to disperse, to give a mixed dispersion liquid. Spinning and spraying were carried out side by side in parallel at a high voltage of about 25 KV, the distance between the spinning sprayer and spraying sprayer and the drum receiving device was about 30 cm, and the flow rate of the polymethyl methacrylate solution in the spinning sprayer was about 10 μL/min, the flow rate of the mixed dispersion liquid in the spraying sprayer was about 30 μL/min, and after working in this way for about 10 hours, a flexible solid-state cathode thin film was peeled off the drum receiving device, and then was rolled at about 100 KPa for about 60 minutes to obtain a thickness of 30 μm, then immersed in a lithium perchlorate/ethanol solution for a period of time and then dried to obtain a mass ratio of the electrolyte salt to the organic fiber material of 1:5, that is, a flexible solid-state cathode composite material, with an ionic conductivity of 1.0×10$^{-4}$ S/cm and a density of 1.9 g/cm$^3$, wherein the content of lithium cobalt oxide was about 30 wt. %.

EMBODIMENT 2-7

About 1 g of commercially available polyacrylonitrile (PAN) powder was dissolved in 10 g of N,N-dimethylformamide (DMF) to obtain a polyacrylonitrile solution. About 1 g of commercially available sodium cobalt oxide (Na$_{0.5}$CoO$_2$) powder with a particle size of about 700 nm was added to about 20 g of ethanol containing about 1 wt. % of a surfactant and stirred to disperse, to give a dispersion liquid of the cathode active material. Spinning and spraying were carried out side by side in parallel at a high voltage of about 15 KV, the distance between the spinning sprayer and spraying sprayer and the drum receiving device was about 6 cm, and the flow rate of the polyacrylonitrile solution in the spinning sprayer was about 2 μL/min, the flow rate of the dispersion liquid of the cathode active material in the spraying sprayer was about 200 μL/min, and after working in this way for about 8 hours, a flexible solid-state cathode thin film was peeled off the drum receiving device, and then was rolled at about 5 MPa for about 5 minutes to obtain a flexible solid-state cathode thin film with a thickness of 500 μm, wherein the content of the cathode active material was about 50 wt. %, and then the flexible solid-state cathode thin film was added dropwise with enough 0.5 M of lithium perchlorate-ethanol solution and vacuum heated to remove the ethanol solution to obtain a mass ratio of the electrolyte salt to the organic fiber material of 1:10, to give a solid-state cathode composite material with an ionic conductivity of 1.0×10$^{-4}$ S/cm and a density of 2.6 g/cm$^3$.

Control 2-1 (Side by Side VS Orthogonally)

Figure 20:
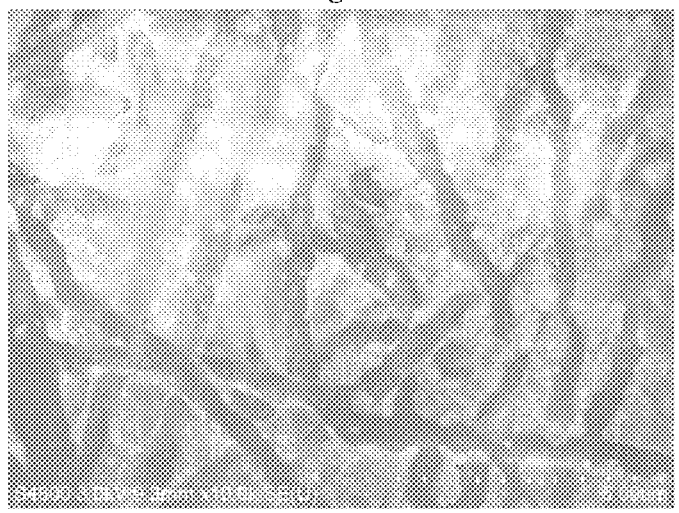
FIG. 20 is a scanning electron microscope diagram of a flexible solid-state cathode composite material prepared in control 2-1 of the present disclosure.

About 1 g of commercially available polyvinylidene fluoride (PVDF) powder was dissolved in 10 g of N,N-dimethylformamide (DMF) to obtain a polyvinylidene fluoride solution. About 1 g of commercially available lithium nickel-manganate with a particle size of about 0.5 micron was added to about 20 g of ethanol containing about 0.1 wt. % of a surfactant and stirred to disperse, to give a dispersion liquid of lithium nickel-manganate. Spinning and spraying were carried out by two sprayers in an orthogonal manner at a high voltage of 25 KV at the same time, the distance between the two sprayers and the drum receiving device was 10 cm, and the flow rate of the polyvinylidene fluoride solution in the spinning sprayer was about 10 μL/min, the flow rate of the dispersion liquid of lithium nickel-manganate in the spraying sprayer was about 70 μL/min, and after working in this way for about 10 hours, a flexible lithium ion electrolyte thin film was peeled off the drum receiving device, wherein, the content of lithium nickel-manganate was about 60 wt. %. The scanning electron micrograph diagram of the thin film prepared by this control is shown in FIG. 20, from which it can be seen that the distribution of lithium nickel-manganate is not very even.

Control 2-2 (Polymer and the cathode active material were composited and spun together)

About 1 g of commercially available polyvinylidene fluoride (PVDF) powder and about 1 g of commercially available lithium nickel-manganate with a particle size of about 0.5 micron were dispersed in N,N-dimethylformamide (DMF) and stirred evenly for a long time, and the evenly mixed solution was spun at a high voltage of about 15 KV, the distance between the sprayer and the drum receiving device was about 8 cm, and the flow rate of the cathode mixed solution in the spinning sprayer was about 15 μL/min, and after working in this way for about 20 hours, a thin film was peeled off the drum receiving device, and then was rolled at about 1000 KPa for about 10 minutes, and the content of the inorganic particles was about 50 wt. %.

Control 2-3 (Blade Coating)

About 1 g of commercially available polyvinylidene fluoride (PVDF) powder and about 1 g of commercially available lithium nickel-manganate with a particle size of about 0.5 micron were dispersed in N,N-dimethylformamide (DMF) and stirred evenly for a long time, and then blade coating or curtain coating was used to prepare the cathode thin film, and the cathode thin films prepared by this method had an unevenly dispersed cathode material and an electrode piece with a low ionic conductivity.

From Embodiments 2-1 to 2-7 and Controls 2-1 to 2-3, it can be found that the flexible solid-state cathode composite material obtained by the technical solutions of the present disclosure have high ionic conductivity (meeting the application requirements of electrochemical devices), and meanwhile have good mechanical properties, do not break when bent, and have good processability, and exhibit good electrochemical performance in secondary battery applications.

In addition, referring to Embodiments 2-1 to 2-7, the inventors of the present disclosure also conducted tests with other raw materials and conditions listed in this specification, and similarly obtained flexible solid-state cathode composite materials with high ionic conductivity, and excellent mechanical properties and electrochemical properties.

EMBODIMENT 3-1

Figure 21:
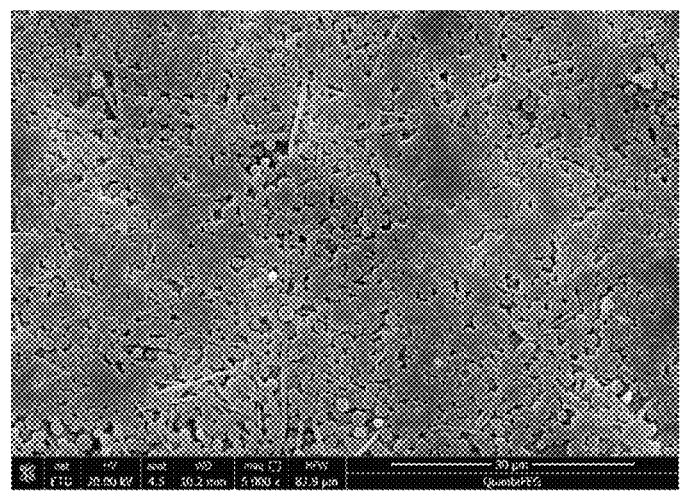
FIG. 21 is a scanning electron microscope diagram of a flexible solid-state anode composite material prepared in Embodiment 3-1 of the present disclosure.
Figure 22:
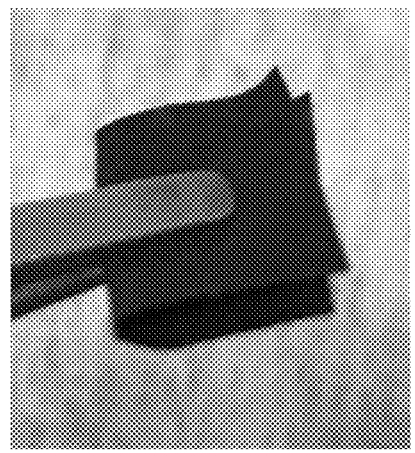
FIG. 22 is a macrophotograph of the flexible solid-state anode composite material prepared in Embodiment 3-1 of the present disclosure.

About 1 g of commercially available polyacrylonitrile (PAN) powder was dissolved in 10 g of N,N-dimethylformamide (DMF) to obtain a polyacrylonitrile solution. About 1 g of commercially available nano silicon powder and 0.14 g of commercially available acetylene black were added to about 20 g of ethanol containing about 1 wt. % of a surfactant and stirred to disperse, to give a mixed dispersion liquid of nano silicon and acetylene black. Spinning and spraying were carried out side by side in parallel at a high voltage of about 20 KV, the distance between the spinning sprayer and spraying sprayer and the drum receiving device was about 10 cm, and the flow rate of the polyacrylonitrile solution in the spinning sprayer was about 10 μL/min, the flow rate of the mixed dispersion liquid in the spraying sprayer was about 70 μL/min, and after working in this way for about 10 hours, a flexible solid-state anode thin film was peeled off the drum receiving device, and then was rolled at about 100 KPa for about 60 minutes, in addition, succinonitrile-5wt. % lithium bis(trifluoromethanesulfonyl)imide (SN-5 wt. % LITFSI) was heated to melt and then dropped a drop into the flexible anode thin film to obtain a mass ratio of the electrolyte salt to the organic fiber material of 1:6, to give a flexible solid-state anode composite material, wherein the content of nano silicon was about 60 wt. %. The scanning electron micrograph of the flexible solid-state cathode film prepared in this embodiment is shown in FIG. 21, its macrophotograph is shown in FIG. 22, and the thickness was tested to be 60 μm, and the density was 1.3 g/cm$^3$. In addition, the flexible solid-state anode composite materials of this embodiment was applied to the all-solid-state batteries, and showed excellent electrochemical properties.

EMBODIMENT 3-2

Figure 23:
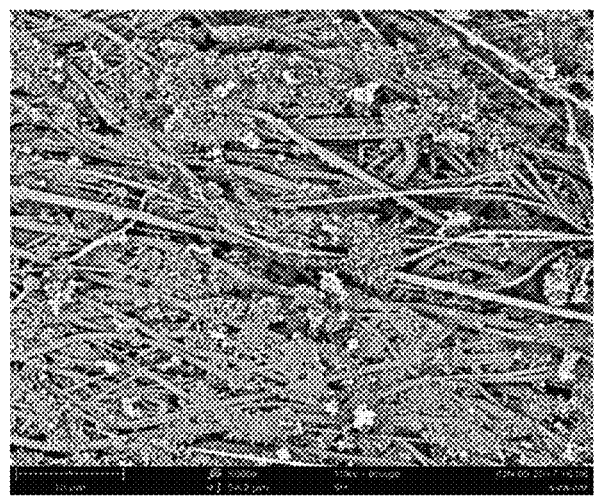
FIG. 23 is a scanning electron microscope diagram of a flexible solid-state anode composite material prepared in Embodiment 3-2 of the present disclosure.

About 1 g of commercially available polytetrafluoroethylene (PTFE) was dissolved in 10 g of ethanol to obtain a polytetrafluoroethylene solution. About 1 g of commercially available manganese oxide powder with a particle size of about 400 nm and 0.14 g of commercially available acetylene black were added to about 20 g of ethanol containing about 1 wt. % of a surfactant and stirred to disperse, to give a mixed dispersion liquid of the anode carbon material. Spinning and spraying were carried out side by side in parallel at a high voltage of about 20 KV, the distance between the spinning sprayer and spraying sprayer and the drum receiving device was about 10 cm, and the flow rate of the polytetrafluoroethylene solution in the spinning sprayer was about 5 μL/min, the flow rate of the mixed dispersion liquid of the anode carbon material in the spraying sprayer was about 250 μL/min, and after working in this way for about 30 hours, a flexible solid-state anode thin film was peeled off the drum receiving device, and then was rolled at about 500 KPa for about 10 minutes, then immersed in a lithium perchlorate/ethanol solution for a period of time and then dried to obtain a mass ratio of the electrolyte salt to the organic fiber material of 1:5, to give a flexible solid-state anode composite material with a thickness of 250 μm, the ionic conductivity was tested to be 1.0×10$^{-4}$ S/cm, the density was 3.5 g/m$^3$, wherein the content of anode manganese oxide was about 85 wt. %. The scanning electron micrograph diagram of the flexible solid-state anode composite material prepared in this embodiment is shown in FIG. 23.

EMBODIMENT 3-3

About 1 g of commercially available polyvinylidene fluoride (PVDF) powder was dissolved in 10 g of N,N-dimethylformamide (DMF) to obtain a polyvinylidene fluoride solution. About 1 g of commercially available lithium titanate powder with a particle size of about 700 nm and 0.1 g of commercially available graphene were added to about 20 g of ethanol containing about 1 wt. % of a surfactant and stirred to disperse, to give an ethanol dispersion liquid of the anode active material. Spinning and spraying were carried out side by side in parallel at a high voltage of about 15 KV, the distance between the spinning sprayer and spraying sprayer and the drum receiving device was about 8 cm, and the flow rate of the polyvinylidene fluoride solution in the spinning sprayer was about 10 μL/min, the flow rate of the ethanol dispersion liquid of the anode active material in the spraying sprayer was about 80 μL/min, and after working in this way for about 8 hours, a flexible solid-state anode thin film was peeled off the drum receiving device, and then was rolled at about 100 KPa for about 1 minutes, then immersed in a lithium perchlorate/ethanol solution for a period of time and then dried to obtain a mass ratio of the electrolyte salt to the organic fiber material of 1:3, to give a flexible solid-state anode composite material with a thickness of 50 μm, the density was tested to be 3.2 g/cm$^3$, wherein the content of anode manganese oxide was about 95 wt. %.

EMBODIMENT 3-4

About 1 g of commercially available polyacrylonitrile (PAN) powder was dissolved in 10 g of N,N-dimethylformamide (DMF) to obtain a polyacrylonitrile solution. About 1 g of commercially available molybdenum oxide powder (MoO$_3$) with a diameter of about 0.2 micron was added to about 20 g of ethanol containing about 1 wt. % of a surfactant and stirred to disperse, to give a dispersion liquid of molybdenum oxide anode active material precursor. Spinning and spraying were carried out side by side in parallel at a high voltage of about 20 KV, the distance between the spinning sprayer and spraying sprayer and the drum receiving device was about 10 cm, and the flow rate of the polyacrylonitrile solution in the spinning sprayer was about 10 μL/min, the flow rate of the dispersion liquid of molybdenum oxide anode active material precursor in the spraying sprayer was about 100 μL/min, and after working in this way for about 20 hours, a flexible solid-state anode thin film was peeled off the drum receiving device, and then was rolled at about 10 MPa for about 5 minutes, in addition, 1 mol/L of lithium bis(trifluoromethanesulfonyl)imide-ethanol solution was added dropwise to the flexible anode thin film and then dried, to give a solid-state anode composite material with a thickness of 150 μm, and the density was tested to be 3.7 g/cm$^3$. Wherein the content of molybdenum oxide was about 75 wt. %, and the mass ratio of the electrolyte salt to the organic fiber material in the solid-state anode was 1:10.

EMBODIMENT 3-5

About 1 g of commercially available polyacrylonitrile (PAN) powder was dissolved in 10 g of N,N-dimethylformamide (DMF) to obtain a polyacrylonitrile solution. About 1 g of commercially available molybdenum oxide powder (MoO$_3$) with a diameter of about 0.3 micron, and 0.2 g of lithium ion fast conductor lithium lanthanum zirconium tantalum oxide (LLZTO) with a particle size of about 300 nm were added to about 20 g of ethanol and stirred to disperse, to give a dispersion liquid of molybdenum oxide anode active material precursor. Spinning and spraying were carried out side by side in parallel at a high voltage of about 50 KV, the distance between the spinning sprayer and spraying sprayer and the drum receiving device was about 10 cm, and the flow rate of the polyacrylonitrile solution in the spinning sprayer was about 10 μL/min, the flow rate of the dispersion liquid of molybdenum oxide anode active material precursor in the spraying sprayer was about 50 μL/min, and after working in this way for about 10 hours, a flexible solid-state anode thin film was peeled off the drum receiving device, and then was rolled at about 400 KPa for about 1 minutes, then immersed in a lithium salt solution for a period of time and dried to give a solid-state anode composite material with a thickness of 80 μm, wherein the content of molybdenum oxide was about 60 wt. %, and the mass ratio of the electrolyte salt to the organic fiber material in the solid-state anode composite material was 1:4.

EMBODIMENT 3-6

About 1 g of commercially available polyvinylidene fluoride (PVDF) powder was dissolved in 10 g of N-methylpyrrolidone to obtain a N-methylpyrrolidone solution. About 1 g of commercially available lithium titanate powder with a particle size of about 700 nm and 0.14 g of commercially available graphite were added to about 20 g of acetone containing about 0.1 wt. % of a surfactant and stirred to disperse, to give a mixed dispersion liquid. Spinning and spraying were carried out at a high voltage of about 30 KV, the distance between the spinning sprayer and spraying sprayer and the drum receiving device was about 20 cm, and the flow rate of the polyvinylidene fluoride solution in the spinning sprayer was about 200 μL/min, the flow rate of the mixed dispersion liquid in the spraying sprayer was about 2 μL/min, and after working in this way for about 35 hours, a flexible solid-state anode thin film was peeled off the drum receiving device, and then was rolled at about 200 KPa for about 20 minutes, then immersed in a lithium salt solution for a period of time and dried to give a flexible solid-state anode composite material with a thickness of 300 μm, wherein the content of the anode active material was about 70 wt. %, and the mass ratio of the electrolyte salt to the organic fiber material in the solid-state anode composite material was 1:2.

EMBODIMENT 3-7

Figure 25:
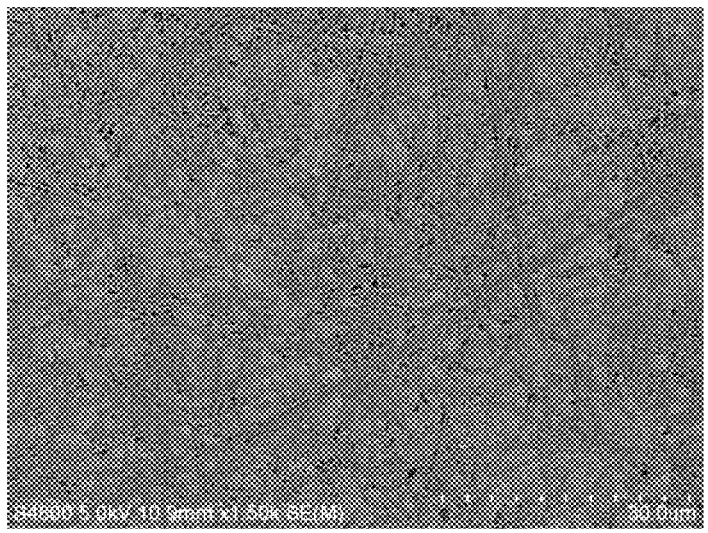
FIG. 25 is a scanning electron microscope diagram of a flexible solid-state anode composite material prepared in Embodiment 3-7 of the present disclosure.

About 1 g of commercially available polyacrylonitrile (PAN) powder was dissolved in 10 g of dimethyl sulfoxide to obtain a polyacrylonitrile solution. About 1 g of commercially available nano silicon powder was added to about 20 g of isopropanol containing about 0.1 wt. % of a surfactant and stirred to disperse, to give a dispersion liquid of nano silicon. Spinning and spraying were carried out side by side in parallel at a high voltage of about 5 KV, the distance between the spinning sprayer and spraying sprayer and the drum receiving device was about 5 cm, and the flow rate of the polyacrylonitrile solution in the spinning sprayer was about 5 μl/min, the flow rate of the dispersion liquid of nano silicon in the spraying sprayer was about 500 μl/min, and after working in this way for about 8 hours, a flexible solid-state anode thin film was peeled off the drum receiving device, and then was rolled at about 100 KPa for about 60 minutes, then immersed in a lithium salt solution for a period of time and dried to give a flexible solid-state anode composite material with a thickness of 60 μm, wherein the content of nano silico was about 80 wt. %, and the mass ratio of the electrolyte salt to the organic fiber material in the solid-state anode composite material was 1:3. The scanning electron micrograph diagram of the flexible solid-state anode composite material is shown in FIG. 25.

EMBODIMENT 3-8

About 1 g of commercially available polymethyl methacrylate (PMMA) was dissolved in 10 g of ethanol to obtain a polymethyl methacrylate solution. About 1 g of commercially available molybdenum oxide powder with a diameter of about 0.3 micron was added to about 20 g of water containing about 0.1 wt. % of a surfactant and stirred to disperse, to give a dispersion liquid of molybdenum oxide anode active material precursor. Spinning and spraying were carried out side by side in parallel at a high voltage of about 25 KV, the distance between the spinning sprayer and spraying sprayer and the drum receiving device was about 30 cm, and the flow rate of the polymethyl methacrylate solution in the spinning sprayer was about 10 μL/min, the flow rate of the dispersion liquid of molybdenum oxide anode active material precursor in the spraying sprayer was about 30 μL/min, and after working in this way for about 5 hours, a flexible solid-state anode thin film was peeled off the drum receiving device, and then was rolled at about 800 KPa for about 25 minutes, then immersed in a lithium salt solution for a period of time and dried to give a solid-state anode composite material with a thickness of 30 μm, wherein the content of molybdenum oxide was about 50 wt. %, and the mass ratio of the electrolyte salt to the organic fiber material in the solid-state anode composite material was 1:6.

EMBODIMENT 3-9

About 1 g of commercially available polyvinylidene fluoride (PVDF) powder was dissolved in 10 g of N-methylpyrrolidone to obtain a N-methylpyrrolidone solution. About 1 g of commercially available lithium titanate powder with a particle size of about 700 nm and 0.14 g of commercially available graphite were added to about 20 g of acetone containing about 0.1 wt. % of a surfactant and stirred to disperse, to give a mixed dispersion liquid. Spinning and spraying were carried out at a high voltage of about 30 KV, the distance between the spinning sprayer and spraying sprayer and the drum receiving device was about 20 cm, and the flow rate of the polyvinylidene fluoride solution in the spinning sprayer was about 10 μL/min, the flow rate of the mixed dispersion liquid in the spraying sprayer was about 100 μL/min, and after working in this way for about 35 hours, a flexible solid-state anode thin film was peeled off the drum receiving device, and then was rolled at about 200 KPa for about 20 minutes, then immersed in a sodium salt solution for a period of time and dried to give a flexible solid-state anode composite material with a thickness of 500 μm, wherein the content of the anode active material was about 70 wt. %, and the mass ratio of the electrolyte salt to the organic fiber material in the solid-state anode composite material was 1:3.

EMBODIMENT 3-10

About 1 g of commercially available polymethyl methacrylate (PMMA) was dissolved in 10 g of ethanol to obtain a polymethyl methacrylate solution. About 1 g of commercially available molybdenum oxide powder with a diameter of about 0.3 micron was added to about 20 g of water containing about 0.1 wt. % of a surfactant and stirred to disperse, to give a dispersion liquid of molybdenum oxide anode active material precursor. Spinning and spraying were carried out side by side in parallel at a high voltage of about 25 KV, the distance between the spinning sprayer and spraying sprayer and the drum receiving device was about 30 cm, and the flow rate of the polymethyl methacrylate solution in the spinning sprayer was about 10 μL/min, the flow rate of the dispersion liquid of molybdenum oxide anode active material precursor in the spraying sprayer was about 30 μL/min, and after working in this way for about 5 hours, a flexible solid-state anode thin film was peeled off the drum receiving device, and then was rolled at about 800 KPa for about 25 minutes, then immersed in a sodium salt solution for a period of time and dried to give a solid-state anode composite material with a thickness of 30 μm, wherein the content of molybdenum oxide was about 50 wt. %, and the mass ratio of the electrolyte salt to the organic fiber material in the solid-state anode composite material was 1:6.

Control 3-1 (Drum without Negative Voltage)

Figure 24:
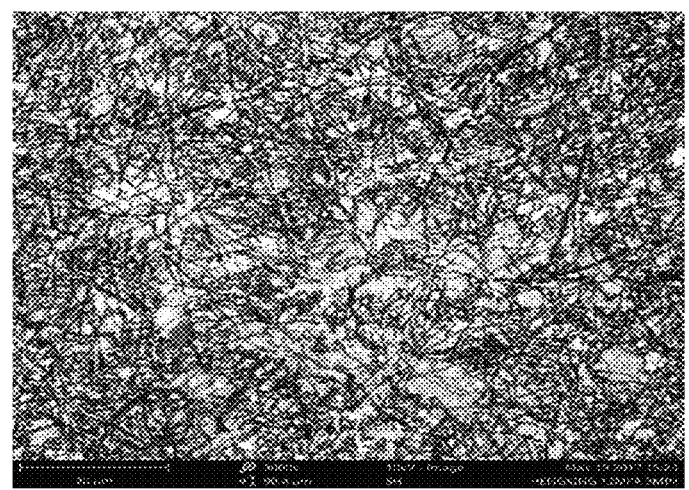
FIG. 24 is a scanning electron microscope diagram of a flexible solid-state anode composite material prepared in Control 3-1 of the present disclosure.

About 1 g of commercially available polyvinylidene fluoride (PVDF) powder was dissolved in 10 g of N,N-dimethylformamide (DMF) to obtain a polyvinylidene fluoride solution. About 1 g of commercially available lithium titanate powder was added to about 20 g of ethanol and stirred to disperse, to give a dispersion liquid of lithium titanate. Spinning and spraying were carried out at a high voltage of 15 KV at the same time, and different from the above mentioned drum of which the receiving surface has a negative charge generator, in this control the drum was grounded, the distance between the spinning sprayer and spraying sprayer and the drum receiving device was 10 cm, and the flow rate of the polyvinylidene fluoride solution in the spinning sprayer was about 10 μl/min, the flow rate of the dispersion liquid of lithium titanate in the spraying sprayer was about 70 μl/min, and after working in this way for about 8 hours, a flexible anode thin film was peeled off the drum receiving device, wherein, the content of the anode material lithium titanate was about 75 wt. %, and during the spinning process, the filaments scattered and the evenness of the final film was relatively poor. The scanning electron micrograph diagram of the flexible anode film prepared in this control is shown in FIG. 24.

Control 3-2 (Side by Side VS Orthogonally)

About 1 g of commercially available polyacrylonitrile (PAN) powder was dissolved in 10 g of N,N-dimethylformamide (DMF) to obtain a polyacrylonitrile solution. About 1 g of commercially available nano silicon powder was added to about 20 g of ethanol and stirred to disperse, to give a dispersion liquid of nano silicon. Spinning and spraying were carried out by two sprayers in an orthogonal manner at a high voltage of 15 KV at the same time, the distance between the two sprayers and the drum receiving device was 8 cm, and the flow rate of the polyacrylonitrile solution in the spinning sprayer was about 10 μL/min, the flow rate of the dispersion liquid of nano silicon in the spraying sprayer was about 70 μL/min, and after working in this way for about 8 hours, a flexible anode thin film was peeled off the drum receiving device, wherein the content of nano silicon was about 60 wt. %, with a poor evenness.

Control 3-3 (Polymer and the Anode Active Material were Composited and Spun Together)

About 1 g of commercially available polyethylene oxide (PEO) was dissolved in 10 g of ethanol to obtain a polyethylene oxide solution. Then, about 2 g of commercially available lithium titanate powder with a particle size of about 700 nm and 0.14 g of commercially available graphene were added to the above polyethylene oxide solution and stirred to disperse, to give a mixed anode solution. Spinning was carried out at a high voltage of about 15 KV, the distance between the sprayer and the drum receiving device was about 8 cm, and the flow rate of the mixed anode solution in the spinning sprayer was about 10 μL/min, and after working in this way for about 20 hours, a thin film was peeled off the drum receiving device, and then was rolled at about 100 KPa for about 10 minutes, then immersed in a lithium salt solution for 2 minutes to obtain a flexible lithium titanate thin film with a thickness of 140 μm, and although the content of the inorganic anode particles was up to 66 wt. %, the compactness and conductivity of the film were poor, and the production yield of this control was low.

Control 3-4 (Blade Coating)

About 1 g of commercially available polytetrafluoroethylene (PTFE), about 1 g of commercially available manganese oxide powder with a particle size of about 400 nm and about 0.14 g of acetylene black, and enough lithium perchlorate were dispersed in N,N-dimethylformamide (DMF) and stirred evenly for a long time, and then blade coating or curtain coating was used to prepare the anode thin film, to give a thin film with a content of the inorganic particles of 50 wt. %. However, the anode film prepared by this kind of method has an uneven distribution of inorganic anode particles and low conductivity.

From Embodiments 3-1 to 3-10, it can be found that the flexible solid-state anode composite material obtained by the above technical solutions of the present disclosure have high ionic conductivity (meeting the application requirements of electrochemical devices), and meanwhile have good mechanical properties, and have good processability, and exhibit good electrochemical performance in secondary battery applications.

In addition, referring to Embodiments 3-1 to 3-10, the inventors of the present disclosure also conducted tests with other raw materials and conditions listed in this specification, and similarly obtained flexible solid-state anode composite materials with high ionic conductivity, and excellent mechanical properties and electrochemical properties.

EMBODIMENT 4-1

The present embodiment provides an all-solid-state lithium battery, comprising a cathode, an anode and a flexible solid-state electrolyte film. Wherein, the cathode was formed by coating a composite of a cathode active material and a solid-state electrolyte on a cathode current collector, and the anode was formed by coating a composite of an anode active material and the solid-state electrolyte on an anode current collector. The composite of the cathode active material and the solid-state electrolyte, and the composite of the anode active material and the solid-state electrolyte are prepared according to the prior art. Wherein, the flexible solid-state electrolyte film was the solid-state electrolyte prepared according to Embodiment 1-6.

The coating thickness of the composite of the cathode active material and the solid-state electrolyte was 50-100 μm, and the composition and coating process were as follows: the cathode active material, the solid-state electrolyte, the conductive carbon black, and the binder were mixed evenly in the solvent in a mass ratio of 6:3:0.5:0.5, then coated on the current collector, and then heated to a high temperature to evaporate the solvent to form the cathode material. The solid-state electrolyte is polyethylene oxide composite lithium salt.

The coating thickness of the composite of the anode active material and the solid-state electrolyte was 50-100 μm, and the composition and coating process were as follows: the anode active material, the solid-state electrolyte, the conductive carbon black, and the binder were mixed evenly in the solvent in a mass ratio of 6:3:0.5:0.5, then coated on the current collector, and then heated to a high temperature to evaporate the solvent to form the anode material. The solid-state electrolyte is polyethylene oxide composite lithium salt.

The prepared all-solid-state lithium battery has good electrochemical performance and mechanical performance.

EMBODIMENT 4-2

The present embodiment provides an all-solid-state lithium battery, comprising a cathode, an anode and a solid-state electrolyte. Wherein, the cathode was formed by coating the flexible film-like solid-state cathode composite material of Embodiment 2-1 on a cathode current collector, the anode was formed by coating the flexible film-like solid-state anode composite material of Embodiment 3-1 on an anode current collector, and the solid-state electrolyte was the solid-state electrolyte prepared in Embodiment 1-1. The prepared all-solid-state lithium battery has good electrochemical performance and mechanical performance.

It should be noted that the technical features of the above-mentioned embodiments can be combined arbitrarily, and in order to simplify the description, not all possible combinations of the various technical features in the above-mentioned embodiments are described, however, as long as are there is no contradiction in combinations of these technical features, it should be considered as the scope of this specification.

The above-mentioned embodiments only give expression to several implementations of the present disclosure, and the descriptions thereof are very specific and detailed, but should not be construed as limiting to the scope of the disclosure patent. It should be noted that, for a person of ordinary skill in the art, several modifications and improvements can further be made without departing from the concept of the present disclosure, which all fall within the protection scope of the present disclosure. Therefore, the protection scope of this application shall be subject to the appended claims.

What is claimed is:

1. A preparation method of an electrochemical device being an all-solid-state battery,
wherein the electrochemical device comprises a solid-state electrolyte,
wherein the solid-state electrolyte comprises membrane material(s) and electrolyte salt(s), wherein, the membrane material(s) comprises an organic phase formed of polymeric material(s), the organic phase comprises a three-dimensionally interconnected interface and has a specific interfacial area greater than or equal to $1 \times 10^4$ cm$^2$/cm$^3$, and the electrolyte salt(s) is dissolved in the organic phase,
wherein the solid-state electrolyte is prepared according to the following:
spraying solution(s) of the polymeric material(s) onto a selected receiving surface using electrostatic spinning technique to form primary structure(s) in the form of fibers and causing the primary structure(s) in the form of fibers to aggregate and form three-dimensional secondary structure(s), then treating the secondary structure(s) under pressure to be more dense to give the organic phase as the membrane material(s); or spraying solution(s) of the polymeric material(s) onto a selected receiving surface using electrostatic spinning technique to form primary structure(s) in the form of fibers and causing the primary structure(s) in the form of fibers to aggregate and form three-dimensional secondary structure(s), and at the time of performing electrostatic spinning, spraying dispersion liquid(s) of inorganic particles onto the selected receiving surface using electrostatic spraying technique to obtain a composite material constituted by the organic phase composed of the polymeric material(s) and the inorganic particles, then treating the composite material under pressure to be more dense to serve as the membrane material(s); and
dropwise adding or spraying solution(s) of the electrolyte salt(s) into the membrane material(s); or, immersing the membrane material(s) in the solution(s) of the electrolyte salt(s), then dried to remove solvent to obtain the solid-state electrolyte.

2. The preparation method of the electrochemical device according to claim 1, wherein the solid-state electrolyte is composed of the membrane material(s) and the electrolyte salt(s).

3. A preparation method of an electrochemical device being an all-solid-state battery,
wherein the electrochemical device comprises a solid-state electrolyte,
wherein the solid-state electrolyte comprises membrane material(s) and electrolyte salt(s), wherein, the membrane material(s) comprises an organic phase formed of polymeric material(s), the organic phase comprises a three-dimensionally interconnected interface and has a specific interfacial area greater than or equal to $1\times10^4$ cm$^2$/cm$^3$, and the electrolyte salt(s) is dissolved in the organic phase,
wherein the method comprises the preparation method of the solid-state electrolyte,
the preparation method of the solid-state electrolyte comprises:
(1) obtaining the membrane material(s) by the following method a) or b):
a) spraying solution(s) of the polymeric material(s) onto a selected receiving surface using electrostatic spinning technique to cause polymeric fibers to aggregate and form three-dimensional structure(s), and then treating the three-dimensional structure(s) under pressure to be more dense to obtain an organic phase with a three-dimensionally interconnected interface as the membrane material(s);
b) spraying solution of the polymeric material(s) onto a selected receiving surface using electrostatic spinning technique to aggregate polymeric fibers to form three-dimensional structure(s), and at the time of performing electrostatic spinning, spraying dispersion liquid(s) of inorganic particles onto the selected receiving surface using electrostatic spraying technique to obtain a composite material constituted by the organic phase and the inorganic particles, then treating the composite material under pressure to be more dense to serve as the membrane material(s), wherein electrostatic spinning liquid outlet(s) for spraying the polymeric solution(s) and electrostatic spraying liquid outlet(s) for spraying the dispersion liquid(s) of the inorganic particles are arranged side by side in parallel, and the spraying direction of the electrostatic spinning liquid outlet(s) and the spraying direction of the electrostatic spraying liquid outlet(s) form an angle greater than or equal to 0 and less than 90°; and
(2) dropwise adding or spraying solution(s) of the electrolyte salt(s) into the membrane material(s); or, immersing the membrane material(s) in solution(s) of the electrolyte salt(s), then dried to remove solvent to obtain the solid-state electrolyte.

4. The preparation method of the electrochemical device according to claim 3, wherein the receiving surface is a surface of a receiving device, and the receiving device is selected from the group consisting of drum receiving devices, flat receiving devices, aqueous solution receiving devices, and combinations thereof.

5. The preparation method of the electrochemical device according to claim 4, wherein the receiving device is a drum receiving device, and the drum keeps rotating during spraying.

6. The preparation method of the electrochemical device according to claim 3, wherein in method b), when spraying, the electrostatic spinning liquid outlet(s) and/or the electrostatic spraying liquid outlet(s) move relative to the receiving surface along the axial direction, length direction or width direction of the receiving device.

7. The preparation method of the electrochemical device according to claim 1, wherein the ionic conductivity of the solid-state electrolyte under room temperature is greater than or equal to $1.0\times10^{-4}$ S/cm; and/or
the thickness of the membrane material(s) is 5 to 90 µm, and/or
the area specific conductance of the solid-state electrolyte at room temperature is 500 to 2500 mS·cm$^{-2}$, and/or
the specific interfacial area of the organic phase is $1\times10^4$ cm$^2$/cm$^3$ to $1\times10^8$ cm$^2$/cm$^3$, and/or
the mass ratio of the electrolyte salt(s) to the organic phase is 1:2 to 1:10, and/or
the molecular structure of the polymeric material(s) has polar group(s) capable of complexing with a metal ion(s) of the electrolyte salt(s), and/or
the electrolyte salt(s) is a lithium salt, a sodium salt, a potassium salt, a magnesium salt or an aluminum salt.

8. The preparation method of the electrochemical device according to claim 1, wherein the ionic conductivity of the solid-state electrolyte under room temperature is $1.0\times10^{-4}$ S/cm to $1.0\times10^{-2}$ S/cm, and/or
the thickness of the membrane material(s) is 10 to 60 µm, and/or
the area specific conductance of the solid-state electrolyte at room temperature is 1000 to 2500 mS·cm$^{-2}$, and/or
the specific interfacial area of the organic phase is $3\times10^4$ cm$^2$/cm$^3$ to $1\times10^8$ cm$^2$/cm$^3$, and/or
the mass ratio of the electrolyte salt(s) to the organic phase is 1:3 to 1:6, and/or
the polymeric material(s) is polymeric material(s) having a molecular structure(s) with polar group(s) selected from the group consisting of ether bonds, carbonyl, ester, amino, fluorine, amide, cyano, and combinations thereof, and/or
the electrolyte salt(s) is selected from the group consisting of lithium bis(trifluoromethanesulfonyl)imide, lithium trifluoromethanesulfonate, lithium bis(pentafluoroethanesulfonyl)imide, lithium bis(fluorosulfonyl)imide, lithium perchlorate, lithium hexafluoroarsenate, lithium hexafluorophosphate, and combinations thereof.

9. The preparation method of the electrochemical device according to claim 1, wherein the ionic conductivity of the solid-state electrolyte under room temperature is $1.0\times10^{-4}$ S/cm to $2.0\times10^{-3}$ S/cm, and/or
the thickness of the membrane material(s) is 10 to 30 µm, and/or
the area specific conductance of the solid-state electrolyte at room temperature is 2000 to 2500 mS·cm$^{-2}$, and/or
the polymeric material(s) is selected from the group consisting of polyacrylonitrile, polyvinylpyrrolidone, polymethyl methacrylate, polyvinylidene fluoride, polytetrafluoroethylene, polyethylene oxide, polypropylene oxide, poly(ethylene succinate), polyethylene sebacate, polyethylene glycol, polyethylene glycol diamine, and combinations thereof.

10. The preparation method of the electrochemical device according to claim 1, wherein the thickness of the membrane material(s) is 20 to 30 µm; and/or
the organic phase is a film formed by aggregation of polymeric fibers.

11. The preparation method of the electrochemical device according to claim 1, wherein the membrane material(s) is consisted of the organic phase; or the membrane material(s) further comprises inorganic particles for increasing the specific interfacial area of the organic phase.

12. The preparation method of the electrochemical device according to claim 1, wherein the organic phase has secondary structure(s) formed by primary structural unit(s) in an aggregated and/or superimposed manner, and the secondary structure(s) provides the three-dimensionally interconnected interface.

13. The preparation method of the electrochemical device according to claim 1, wherein the membrane material(s) further comprises inorganic particles for increasing the specific interfacial area of the organic phase, and the inorganic particles are distributed between the primary structural unit(s).

14. The preparation method of the electrochemical device according to claim 1, wherein the primary structural unit(s) is selected from the group consisting of polymeric fibers, polymeric particles, and polymeric sheets and any combination thereof, and the inorganic particles are attached to and/or embedded in the surfaces of the primary structural unit(s).

15. The preparation method of the electrochemical device according to claim 1, wherein the particle size of the inorganic particles is 2 nm to 10 μm; and/or
the inorganic particles are inorganic non-ionic conductors; or, the inorganic particles are inorganic ionic conductors; or, the inorganic particles are a combination of inorganic non-ionic conductors and inorganic ionic conductors; and/or
the content of inorganic particles in the solid-state electrolyte is less than or equal to 95 wt. %.

16. The preparation method of the electrochemical device according to claim 1, wherein the particle size of the inorganic particles is 10 nm to 2 μm; and/or
the inorganic non-ionic conductors are selected from the group consisting of oxides, sulfides, nitrides, fluorides, chlorides, carbides, and combinations thereof; and/or
the content of inorganic particles in the solid-state electrolyte is less than or equal to 80 wt. %.

17. The preparation method of the electrochemical device according to claim 1, wherein the particle size of the inorganic particles is 20 nm to 2 μm; and/or
the content of inorganic particles in the solid-state electrolyte is 20 wt. % to 80 wt. %.

18. The preparation method of the electrochemical device according to claim 1, wherein the particle size of the inorganic particles is 50 nm to 2 μm; and/or
the content of inorganic particles in the solid-state electrolyte is 50 wt. % to 80 wt. %.

19. The preparation method of the electrochemical device according to claim 1, wherein the particle size of the inorganic particles is 50 nm to 500 nm; and/or
the content of inorganic particles in the solid-state electrolyte is 70 wt. % to 80 wt. %.

* * * * *